(12) United States Patent
Kato et al.

(10) Patent No.: US 6,654,515 B2
(45) Date of Patent: Nov. 25, 2003

(54) PHOTOELECTRIC BACK PLANE BOARD AND INFORMATION PROCESSING SYSTEM

(75) Inventors: Makoto Kato, Aichi-ken (JP); Shoji Ito, Aichi-ken (JP); Akihiro Tanaka, Aichi-ken (JP); Kenichi Higashiura, Aichi-ken (JP); Naoki Kamiya, Aichi-ken (JP)

(73) Assignee: Aica Kogyo Co., Ltd., Aichi-ken (JP)

( * ) Notice: Subject to any disclaimer, the term of this patent is extended or adjusted under 35 U.S.C. 154(b) by 0 days.

(21) Appl. No.: 10/244,730

(22) Filed: Sep. 16, 2002

(65) Prior Publication Data

US 2003/0053786 A1 Mar. 20, 2003

Related U.S. Application Data

(63) Continuation-in-part of application No. 10/113,528, filed on Mar. 29, 2002.

(30) Foreign Application Priority Data

| Sep. 17, 2001 | (JP) | ......................................... | 2001-281477 |
| Feb. 8, 2002 | (JP) | ......................................... | 2002-032820 |
| Mar. 26, 2002 | (JP) | ......................................... | 2002-084639 |
| Mar. 26, 2002 | (JP) | ......................................... | 2002-085787 |
| Jul. 31, 2002 | (JP) | ......................................... | 2002-222963 |
| Aug. 1, 2002 | (JP) | ......................................... | 2002-224337 |

(51) Int. Cl.⁷ ............................................. G02B 6/28
(52) U.S. Cl. ......................................... 385/24; 385/129
(58) Field of Search ........................ 385/24, 129, 130, 385/131, 132

(56) References Cited

U.S. PATENT DOCUMENTS

| 5,822,475 A | * 10/1998 | Hirota et al. | ................... 385/24 |
| 5,987,198 A | * 11/1999 | Hirota et al. | ................... 385/24 |
| 5,995,262 A | * 11/1999 | Hirota et al. | ............... 398/164 |
| 6,097,864 A | * 8/2000 | Kropp | ......................... 385/44 |

FOREIGN PATENT DOCUMENTS

| JP | 2001-356236 | * 12/2001 |
| JP | 2002-40281 | * 2/2002 |
| JP | 2002-196174 | * 7/2002 |
| JP | 2002-243973 | * 8/2002 |

OTHER PUBLICATIONS

Wada, Osadu, "Optical Interconnection Technology and Its Applications", Technical Survey, vol. 79, No.9, Sep. 1996, pp. 906–909.

Ishikawa, Masatoshi, "Toward New Computing Systems with Optical Interconnections", vol. 1, No.3, 1998, pp. 176–179.

Okada, Junji, Shinya Kyozuka, Tsutomu Hamada, Hidenori Yamada, Masao Funada and Takashi Ozawa, "Study on Backplane Optics and Apply to Optical Data Bus", New Business Center, Fuji Xerox Co., Ltd., 1999, 2 pages.

* cited by examiner

*Primary Examiner*—Tulsidas Patel
(74) *Attorney, Agent, or Firm*—Davis & Bujold, PLLC

(57) ABSTRACT

A photoelectric back plane board is provided to facilitate the relative positioning of an optical data bus and light emitting/receiving devices, interconnection of a circuit board for optical communication and respective elements, and supplying power and inputting/outputting signals to/from the printed circuit board. In the photoelectric back plane board, the optical data bus is inserted into a recess within an optical data bus fixing board and a connector holding light emitting/receiving devices is positioningly fixed to the fixing board via through holes H formed in the fixing board so that relative positioning of the signal light incoming/outgoing areas and the light emitting/receiving devices can be easily achieved. By mounting the fixing board on a printed circuit board on which an electrical connector is provided, interconnection of a circuit board mounted on the optical connector and the printed circuit board is achieved by means of the electrical connector.

11 Claims, 18 Drawing Sheets

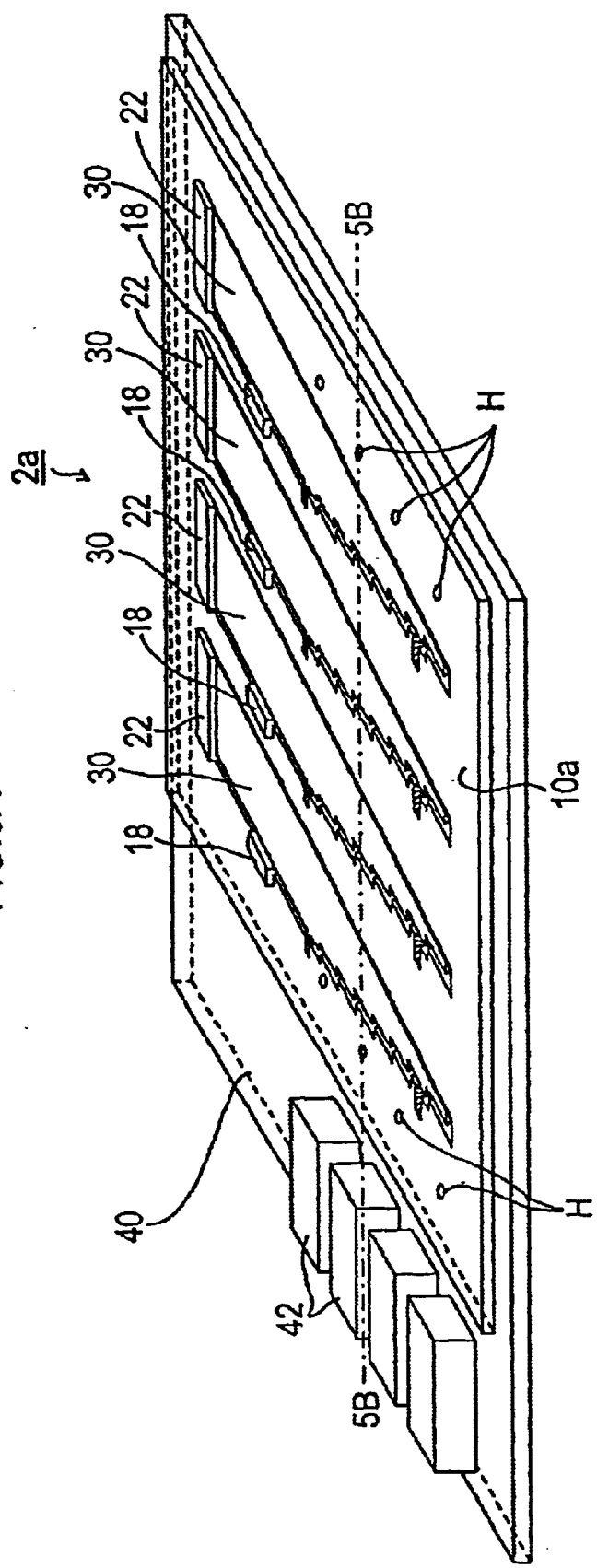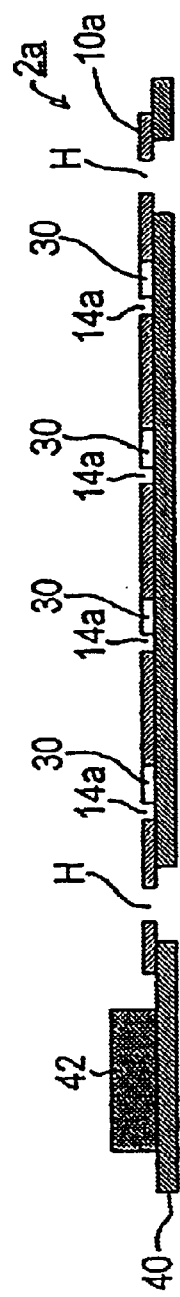

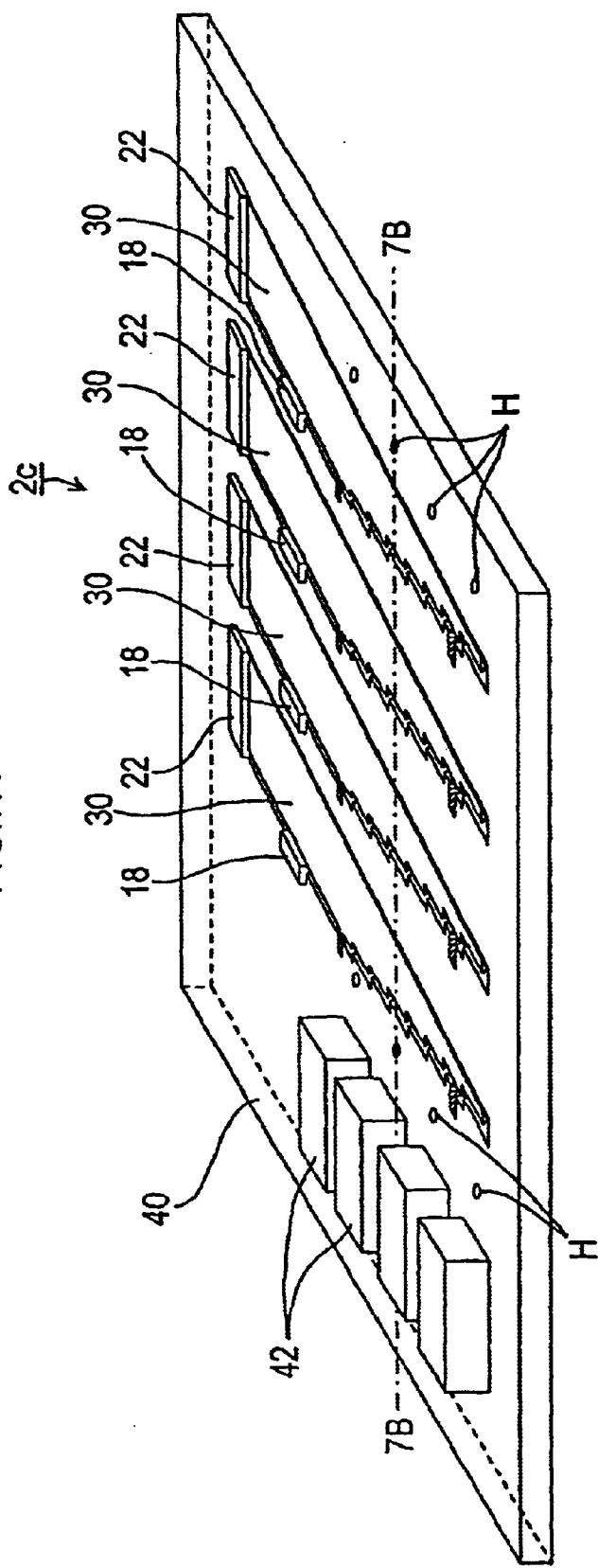
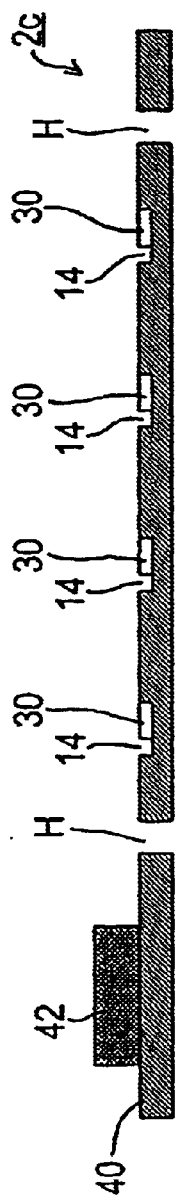
FIG.7A
FIG.7B

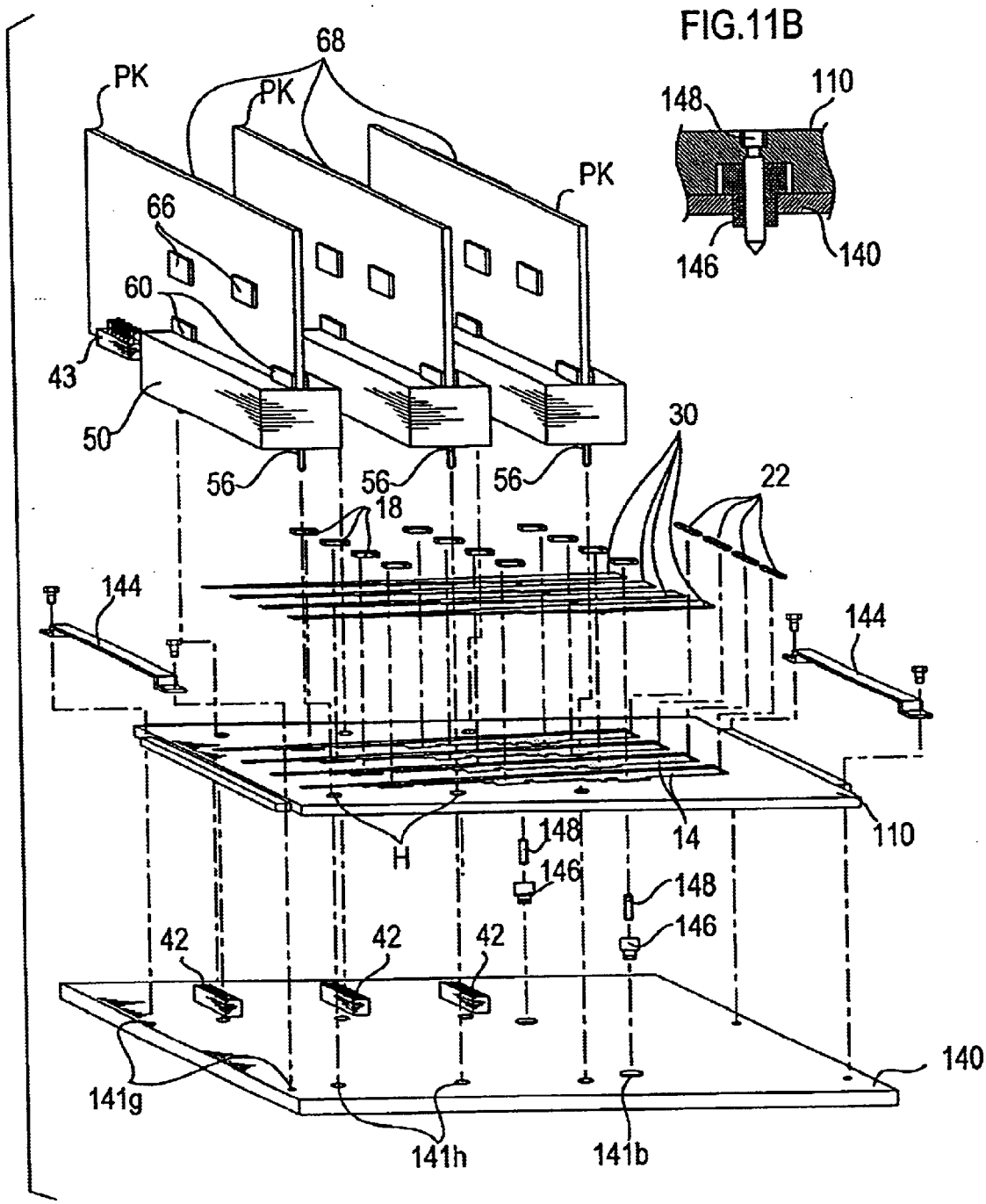

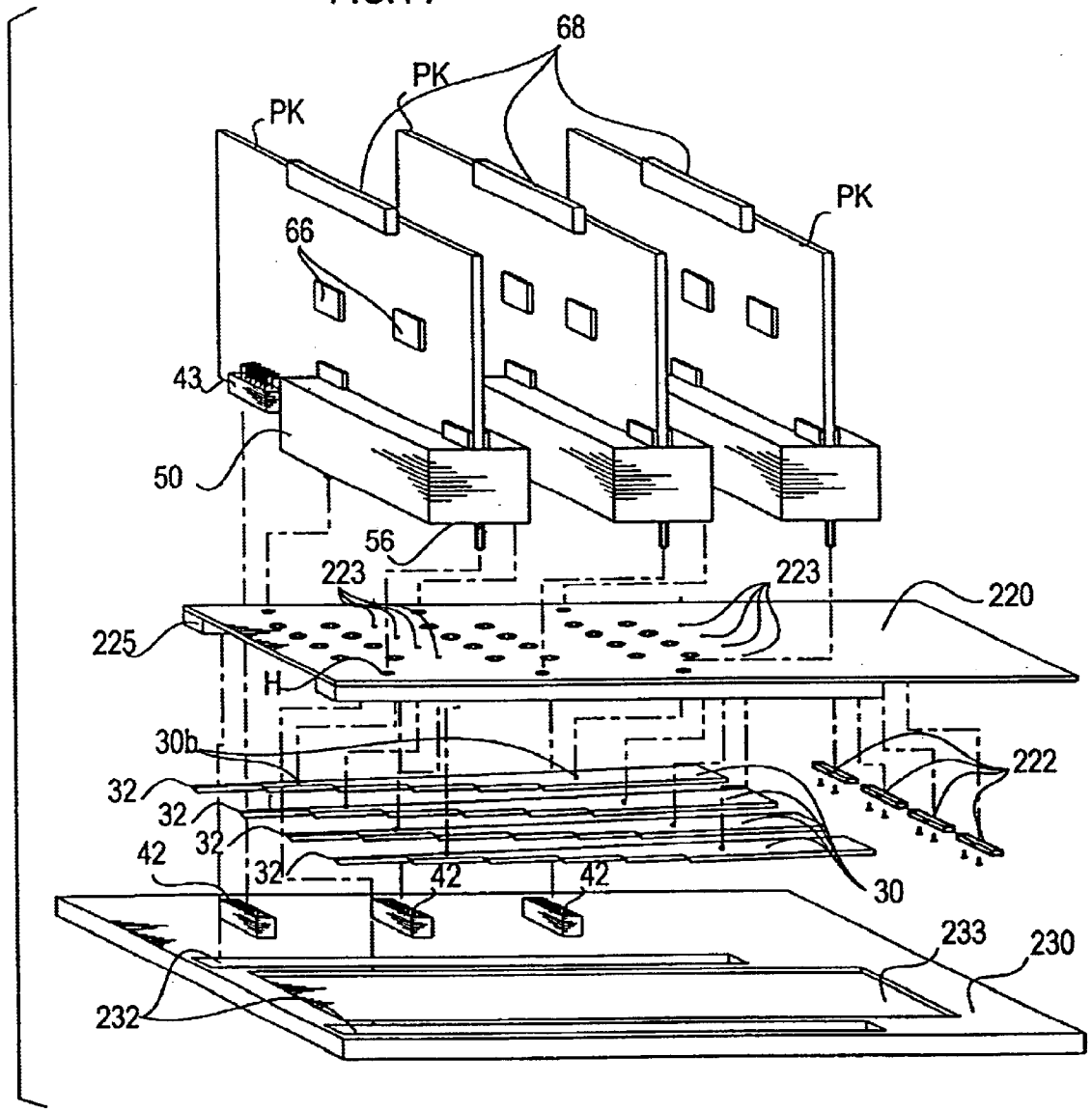

PHOTOELECTRIC BACK PLANE BOARD AND INFORMATION PROCESSING SYSTEM

This is a continuation-in-part application of patent application Ser. No. 10/113,528 filed Mar. 29, 2002.

BACKGROUND OF THE INVENTION (i) Field of the Invention

The present invention relates to a photoelectric back plane board comprising an optical data bus including a long plate of a light transmissive material having one side formed into a stepwise configuration and signal light incoming/outgoing areas formed by sloping each end surface of each step approximately at 45 degrees in relation to the plate surface, and relates to an information processing system using the photoelectric back plane board.

(ii) Description of the Related Art

To improve the processing performance of a signal processing unit, which employs a parallel architecture comprising a back plane board (mother board) and a plurality of nodes (daughter board), enhancement of the bandwidth by increasing the speed of transmission through a bus and bit multiplication has been sought.

Although further speed increase is required for such a signal processing unit employing a parallel architecture, the achievement of further speed increases using a conventional electrical wiring requires a circuit board design for reducing noises and delay with respect to the mother board and the daughter board. Optical fiber interconnection also has been introduced for increasing speed, even though it leads to further complicated wiring.

While increasing speed of a signal processing unit by the conventional electrical wiring is sought, increasing speed of a signal processing unit by intra-system optical interconnection technology called optical interconnection has been considered. As the outline of optical interconnection technology is described, for example, in The Transactions of the Institute of Electronics, Information and Communication Engineers, Vol.79 (No.9), September, 1996, "Optical Interconnection Technology and its Applications" by Osamu WADA, pp.907–909 and in Journal of Japan Institute of Electronics Packaging, Vol. 1, No.3 (1998), "Toward New Computing Systems with Optical Interconnection" by Masatoshi ISHIKAWA, pp.176–179, various forms may be proposed depending on the configuration of a system.

However, when optical interconnection utilizing optical fibers as a signal transmission medium is introduced not only into systems for industrial use but also into systems commonly used in offices and homes, there are problems, such as high packaging cost due to need for accurate positioning of optical connections and difficulty in realizing interconnection of multiple nodes with a simple structure.

As technology to solve these problems, an optical data bus 80 as shown in FIGS. 8A–8C was proposed at The 25th Symposium on Optics, 2000, Lecture No. 8, "Study on Backplane Optics and Apply to Optical Data Bus" by Junji OKADA et al.

The optical data bus 80, which comprises a long plate of light transmissive material (for example, a light transmissive resin composed of an acrylic having a refractive index of 1.49 and an olefin polymer having a refractive index of 1.525, or the like), is a translucent transmission medium for transmitting signal light in the longitudinal direction by repetitive internal reflection.

Specifically, the optical data bus 80 comprises, as shown in FIGS. 8A and 8B, an approximately rectangular substrate of light transmissive resin having one longitudinal side thereof formed into a step-wise configuration, the steps being dimensioned such that light emitting elements (e.g. laser diodes LD) or light receiving elements (e.g. photo diodes PD) can be arranged from the side of one longitudinal end toward the other end. Signal light incoming/outgoing areas 82 are formed by sloping each longitudinal end of each of the steps at 45 degrees in relation to the surface of the substrate. FIG. 8A is a plan view of the optical data bus 80 and FIG. 8B is a side view thereof.

To perform optical transmission using the optical data bus 80, a reflective diffusion portion (e.g. light diffusive film) 84 is provided on the end surface opposite to the signal light incoming/outgoing areas 82 of the optical data bus 80 so that the optical data bus 80 has the diffusion angle in the thickness direction of 0.2 degrees and the diffusion angle in the width direction of 40 degrees. In addition, a laser diode LD or a photo diode PD is disposed above each of the signal light incoming/outgoing areas 82 such that each optical axis intersects perpendicularly to the substrate surface of the optical data bus 80.

Once the laser diode LD disposed above a given signal light incoming/outgoing area is activated and laser beam is irradiated from above the optical data bus 80, the entering light is totally reflected from the end surface sloped at 45 degrees in relation to the substrate surface of the optical data bus 80 and transmitted toward the reflective diffusion portion 84, then reflected and diffused from the reflective diffusion portion 84. The reflected light, in turn, is totally reflected from the end surface of each signal light incoming/outgoing area 82 and emitted from the top surface of the optical data bus 80. Thus, the optical signal emitted from the laser diode LD is transmitted to the photo diode PD disposed above the signal light incoming/outgoing area 82, with the result that the signal transmitted through the laser diode LD and the optical data bus 80 can be obtained from the current flowing through the photo diode PD.

Therefore, if a back plane board including the above described optical data bus as a signal transmission medium is put into practical use, it is possible to achieve interconnection, with a simple configuration, of a plurality of circuit boards provided with at least one of light emitting means comprising an electronic circuit for generating an electrical signal and a light emitting element for converting the electrical signal to an optical signal, and light receiving means comprising a light receiving element for converting an optical signal to an electrical signal and an electronic circuit for processing the converted electrical signal.

The use of the above described optical data bus as a signal transmission medium, however, presents problems of how to fix the optical data bus. Specifically, it is required to relatively position the optical data bus, the light emitting element and the light receiving element such that light is totally reflected from the signal light incoming/outgoing areas and an optical signal is transmitted by repetitive internal reflection through the optical data bus, which is a translucent transmission medium. Also, since optical transmission in the optical data bus utilizes the air having a refractive index of 1 as a cladding layer, it is preferable not to use an adhesive for fixing the optical data bus. However, there has not been provided any appropriate fixing means in order to use, as a signal transmission medium, an optical data bus having a step-wise configuration, as shown in FIGS. 8A to 8C. Therefore, there has been a demand for an optical data bus fixing device which enables efficient transmission of an optical signal using an optical data bus as above.

The inventors of the present invention have devised a method for fixing such an optical data bus by means of a fixing board comprising a flat plate provided with a recess for insertion of an optical data bus opened corresponding to the contour of the optical data bus and a positioning portion for positioning a light emitting element or a light receiving element above each signal light incoming/outgoing area of the optical data bus inserted into the recess for insertion of an optical data bus.

More specifically, the optical data bus is inserted into the recess for insertion of an optical data bus formed in the fixing board and is held with a certain holding member, and then the light emitting element and the light receiving element are positioningly fixed above respective signal light incoming/outgoing areas of the optical data bus inserted into the recess for insertion of an optical data bus by using the positioning portion formed in the fixing board.

The use of such a fixing board facilitates significantly simple setting of the relative positions of the signal light incoming/outgoing areas of the optical data bus and the light emitting element and the light receiving element as well as fixation of the optical data bus without using an additive. Thus, it is possible to meet the above described demand.

However, to actually perform optical communication using an optical data bus fixed within the fixing board, it is necessary to connect the light emitting element and the light receiving element relatively positioned on the optical data bus with a plurality of circuit boards (the above-mentioned daughter boards), so that activation of the light emitting element and processing of the received light may be performed by respective circuit boards.

This has posed other issues of how to connect the light emitting element and the light receiving element, which have been relatively positioned with respect to the optical data bus by using the above described fixing board, with the respective circuit boards which actually perform optical communication by means of the light emitting element and the light receiving element, and of how to control the signal processing performed by the respective circuit boards.

Specifically, optical communication between a plurality of circuit boards by means of the light emitting element and the light receiving element, which have been relatively positioned with respect to the optical data bus by the above described fixing board, requires adjustments, such as synchronizing the activation of the light emitting elements and the processing of the received light performed in the respective circuit boards. Accordingly, it is necessary to provide a variety of control signals, such as a synchronizing signal, to the respective circuit boards. The above-mentioned issue is, in other words, how to connect the light emitting elements and the light receiving elements positioningly fixed to the fixing board with the respective circuit boards in order to facilitate providing signals to the respective circuit boards.

Furthermore, power supply is necessary for the respective circuit boards. In the case where exclusive power lines are employed for power supply, the wiring operation of those exclusive power lines is troublesome. An alternative way is to provide the fixing board with the function of supplying power to the respective circuit boards, so that power may be supplied from the fixing board to the respective circuit boards once the respective circuit boards are mounted on the fixing board. Power supply in such a manner also leads to the issue of how to connect the fixing board with the respective circuit boards.

An object of the present invention, which is to solve the above issues, is to provide a photoelectric back plane board, wherein the optical data bus having a step-wise configuration, and the light emitting elements and the light receiving elements are located at a given relative position, and wherein connection of the circuit board for optical communication with the light emitting elements and the light receiving elements, and signal input/output and power supply to/from the circuit board are facilitated, and to provide an information processing system using the photoelectric back plane board.

SUMMARY OF THE INVENTION

This and other objects are accomplished with a photoelectric back plane board according to the present invention. The photoelectric back plane board comprises a multiple optical data bus fixing board provided with a plurality of recesses for insertion of an optical data bus formed therein, and optical data buses are inserted and fixed in the recesses for insertion of an optical data bus, respectively. By mounting the photoelectric back plane board on a printed circuit board, the optical data buses are positioningly fixed on the printed circuit board. The printed circuit board, or both of the printed circuit board and the multiple optical data bus fixing board are provided with through holes for positioningly fixing a plurality of optical connectors holding a plurality of light emitting elements and light receiving elements for respectively inputting/outputting optical signals to/from signal light incoming/outgoing areas of the optical data buses.

The plurality of recesses for insertion of an optical bus are formed in the multiple optical data bus fixing board at approximately the same intervals, so that when the optical data buses are inserted into the respective recesses for insertion of an optical bus, the corresponding signal light incoming and outgoing areas of the respective optical data buses are aligned on substantially straight lines, respectively. This renders it possible for the light emitting elements and light receiving elements to be aligned on substantially straight lines along the surfaces of a circuit board for optical communication when the circuit board is mounted on the optical connector.

In other words, if only the corresponding signal light incoming/outgoing areas of the respective optical data buses are aligned on substantially straight lines, the optical connector can hold the plurality of light emitting elements and light receiving elements for respectively inputting/outputting signal light to/from the signal light incoming/outgoing areas of the respective optical data buses aligned in rows and the circuit board arranged along the direction of the rows.

In the photoelectric back plane board according to a first embodiment of the invention, an optical connector, i.e. a circuit board, is assigned to one or more groups of signal light incoming/outgoing areas, each group consisting of signal light incoming/outgoing areas of the respective optical data buses aligned on a substantially straight line on the printed circuit board, and the respective optical connectors and the circuit boards mounted on the respective optical connectors are arranged on the printed circuit board so as to cross over, or traverse the respective optical data buses.

In the case where recesses for insertion of an optical data bus are formed as described above, an optical connector and a circuit board are disposed per one or a certain number of adjacent signal light incoming/outgoing areas arranged in the longitudinal direction of an optical data bus. Therefore, a plurality of optical connectors holding light emitting elements and light receiving elements may be all common. Particularly, as described later in preferred embodiments, in which the recesses for insertion of an optical data bus are formed such that the respective signal light incoming/ outgoing areas of all the optical data buses are arranged on an orthogonal grid, the optical connectors and the circuit board mounted thereon may be aligned along the outer shape of the multiple optical data bus fixing board.

The printed circuit board is provided thereon with a plurality of electrical connector for supplying power or inputting/outputting signals to/from the respective circuit boards arranged as above, and supplies power or inputting/ outputting signals via the electrical connectors to/from the respective circuit boards.

According to the photoelectric back plane board of the first embodiment, by utilizing the through holes formed in the printed circuit board, or both of the printed circuit board and the multiple optical data bus fixing board, not only the relative positioning of the optical data buses and the light emitting elements and light receiving elements held in the optical connectors is easily achieved, but also supplying power and inputting/outputting signals from the printed circuit board to the circuit board mounted on the optical connector via the electrical connector can be performed.

Thus, the photoelectric back plane board according to the first embodiment facilitates development of an information processing system by which high-speed data communication among a plurality of circuit boards (above-mentioned daughter boards) using optical data buses is enabled.

Furthermore, the multiple optical data bus fixing board in the photoelectric back plane board according to the first embodiment is removably mounted on the printed circuit board as a base, and therefore the optical data bus can be replaced without directly touching the same by replacing the multiple optical data bus fixing board with the optical data bus fixed therewithin. This can prevents the optical data bus from getting dirty or damaged while replacing the same, and leads to improvement in efficiency of maintenance work.

In a photoelectric back plane board according to another embodiment of the invention, an optical data bus guide plate is employed instead of the multiple optical data bus fixing board according to the first embodiment.

The optical data bus guide plate includes a plate having approximately the same thickness as the optical data bus, and is provided with a plurality of through guide holes having a contour corresponding to the configuration of the optical data bus. The guide holes are formed at approximately the same intervals so that when the respective optical data buses are inserted into the guide holes, the corresponding signal light incoming and outgoing areas of the respective optical data buses may be aligned on substantially straight lines, respectively.

Once the optical data bus guide plate is mounted on the printed circuit board, the optical data buses are inserted and fixed in recesses for insertion of an optical data bus formed with the guide holes and the surface of the printed circuit board by mounting the optical data bus guide plate on the printed circuit board.

The printed circuit board, or both of the printed circuit board and the multiple optical data bus fixing board are provided with through holes for positioningly fixing a plurality of optical connectors which hold a plurality of light emitting elements and light receiving elements for respectively inputting/outputting optical signals to/from signal light incoming/outgoing areas of the optical data bus. The optical connector is adopted to have a circuit board for optical communication mounted thereon in the same manner as in the optical connector of the first embodiment.

The printed circuit board, on which a plurality of electrical connectors are fixed for supplying power or inputting/ outputting signals to circuit boards mounted on the optical connectors positioned on the printed circuit board via the through holes, as in the first embodiment, supplies power or input/output signals to/from the respective circuit boards via the respective electrical connectors.

According to a further embodiment of the photoelectric back plane board, a plurality of single data bus fixing board each having a single recess for insertion of an optical data bus is employed instead of the multiple optical data bus fixing board in the first embodiment.

The plurality of single optical data bus fixing boards are removablly mounted on the printed circuit board such that when the respective optical data buses are inserted and fixed in the recesses for insertion of an optical data bus, the corresponding signal light incoming/outgoing areas of the respective optical data buses are aligned on substantially straight lines, respectively.

The printed circuit board is provided with through holes formed therein, for positioningly fixing a plurality of optical connectors on the printed circuit board, as in the other embodiments. Also, a plurality of electrical connectors for supplying power or inputting/outputting signals to/from circuit boards mounted on the optical connectors which are positioned via the through holes are fixed on the surface of the printed circuit board, on which the single optical data bus fixing board is stacked in layers. The printed circuit board supplies power or inputting/outputting signals to/from the respective circuit boards via the electrical connectors.

According to yet another embodiment of the photoelectric back plane board, instead of using a member for fixing an optical data bus, such as a multiple or single data bus fixing board, or an optical data bus guide plate, a printed circuit board having a plurality of recesses for insertion of an optical data bus formed directly in the surface thereof so that a plurality of optical data buses can be fixed directly on the printed circuit board.

In the printed circuit board, the plurality of recesses for insertion of an optical data bus are formed at approximately the same intervals so that when the respective optical data buses are inserted into the recesses for insertion of an optical data bus, the corresponding signal light incoming/outgoing areas of the respective optical data buses may be aligned on substantially straight lines, respectively.

As in the other embodiments, the printed circuit board is provided with through holes formed therein for positioningly fixing a plurality of optical connectors on the printed circuit board, and a plurality of electrical connectors for supplying power or inputting/outputting signals to/from the respective circuit boards mounted on the optical connectors which are positioned via the through holes. Thus, the printed circuit board may supply power or inputting/outputting signals to/from the respective circuit boards via the electrical connectors.

In a photoelectric back plane board according to a further embodiment of the present invention, the optical data bus fixing board is fixed on the printed circuit board by being positioned by means of at least one positioning member with respect to the printed circuit board at one or a plurality of points on a straight line substantially perpendicular to the longitudinal direction of the optical data bus, and by being pressed on the printed circuit board by a guide rail for covering the optical data bus fixing board from above at a position distant from the point at which the optical data bus fixing board is positioned with respect to the printed circuit board.

In the photoelectric back plane board of the present embodiment, the joints of the optical data bus fixing board and the printed circuit board are limited to the positioning points by the positioning members, i.e. at one or a plurality of points on a straight line substantially perpendicular to the longitudinal direction of the optical data bus, so that the optical data bus fixing board may expand or contract on the printed circuit board with a focus on the joints when the ambient temperature changes.

As a result, it is possible to prevent the optical data bus fixing board from being deformed or cracked due to the change of the ambient temperature, thereby to prevent deterioration of the communication performance by means of the photoelectric back plane board.

BRIEF DESCRIPTION OF THE DRAWINGS

Preferred embodiments of the present invention will now be described with reference to the drawings in which:

FIGS. 5A and 5B are explanatory views showing the entire structure of a photoelectric back plane board according a second embodiment;

FIGS. 7A and 7B are explanatory views showing the entire structure of a photoelectric back plane board according to a fourth embodiment;

FIGS. 9A through 9D are explanatory views showing the entire structure of a photoelectric back plane board according to a fifth embodiment, in which FIG. 9A is a perspective view and FIGS. 9B, 9C and 9D are cress-sectional views along lines 9B—9B, 9C—9C and 9D—9D, respectively, in FIG. 9A;

FIG. 11A is an exploded view of the photoelectric back plane board according to the fifth embodiment and FIG. 11B is an enlarged view of a portion for positioning in the photoelectric back plane board;

FIG. 14 is an exploded view of the photoelectric back plane board according to the sixth embodiment;

DETAILED DESCRIPTION OF PREFERRED EMBODIMENTS

First Embodiment

Figure 1A:
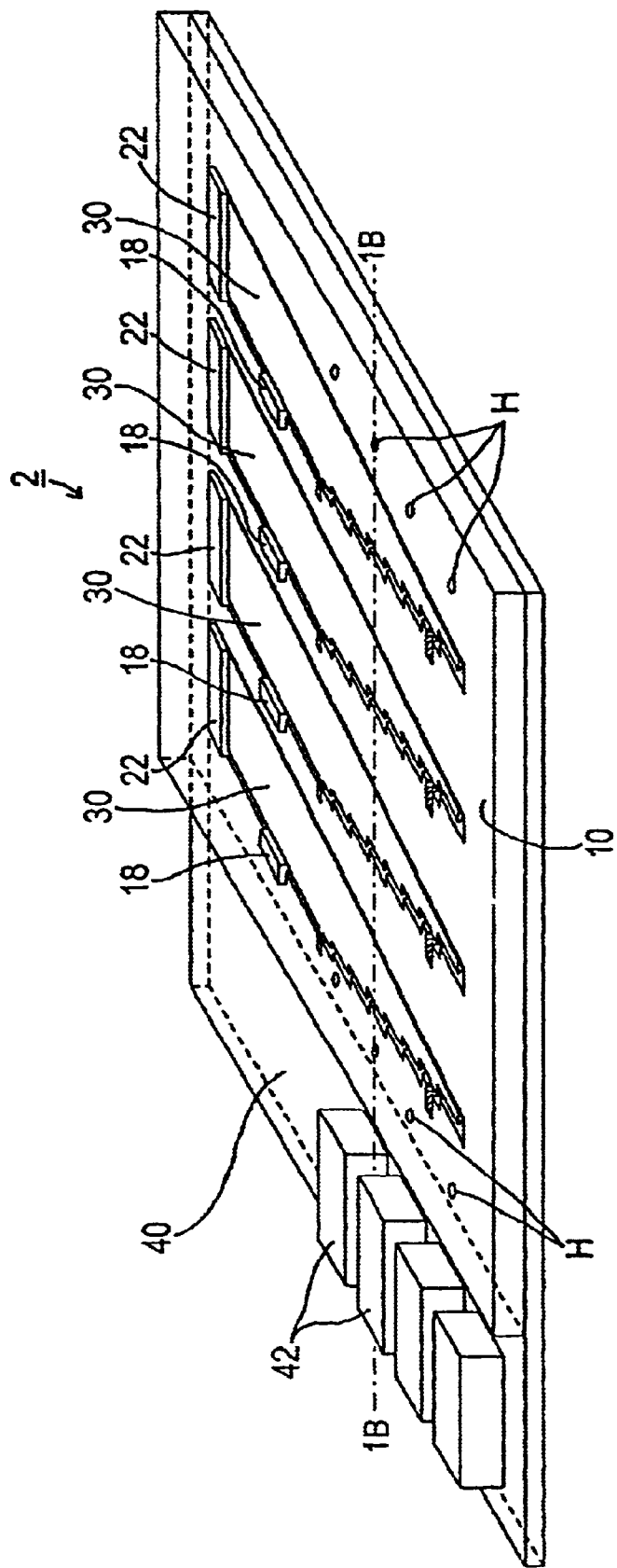
FIGS. 1A and 1B are explanatory views showing the entire structure of a photoelectric back plane board according to a first embodiment.
Figure 1B:
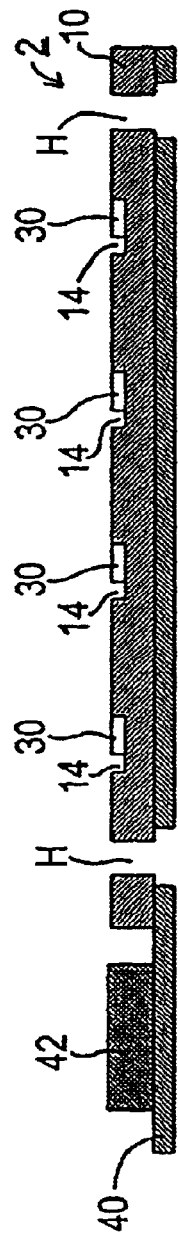
Figure 2:
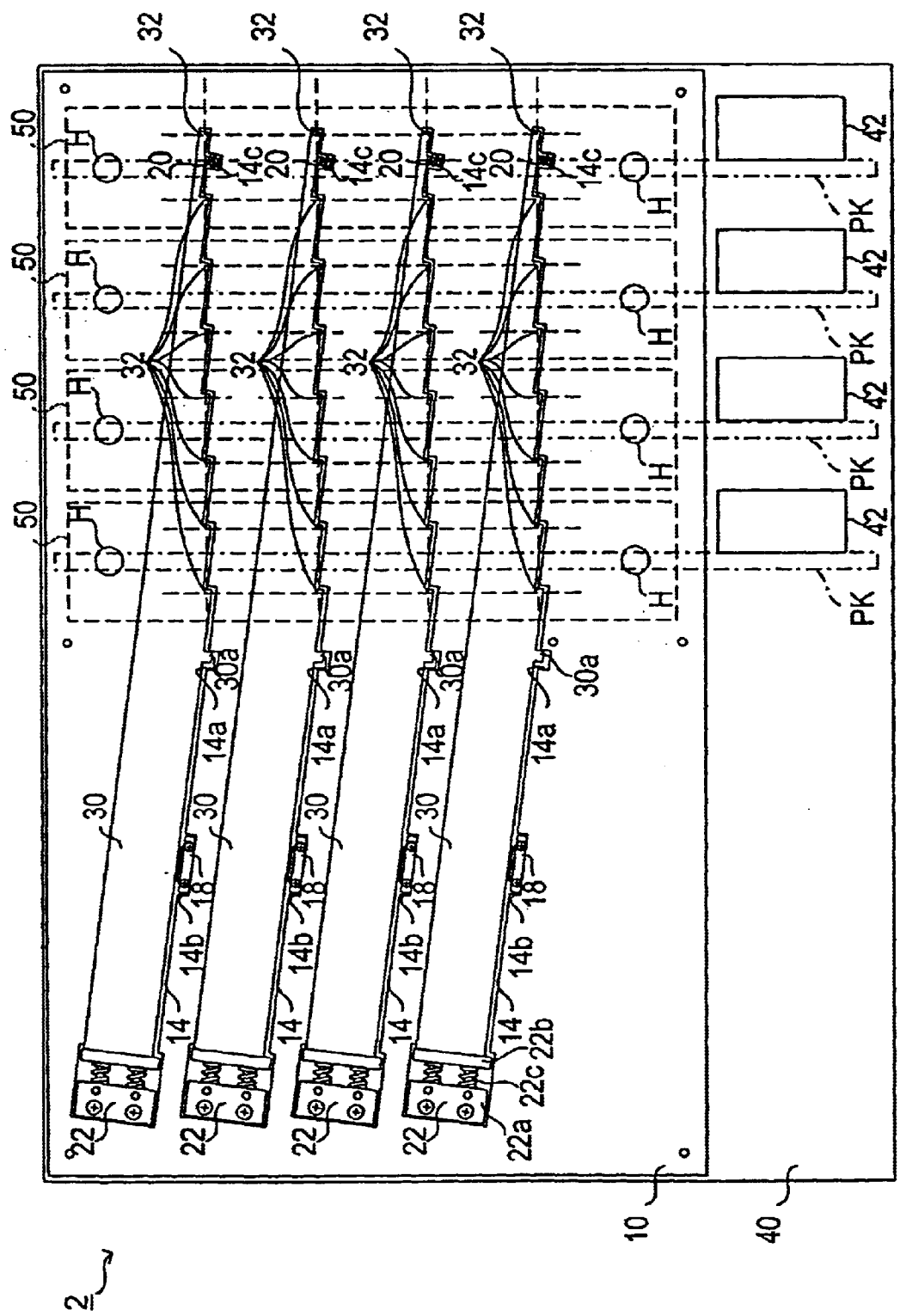
FIG. 2 is a top plan view of the photoelectric back plane board according to the first embodiment.

FIG. 1A is a perspective view of a photoelectric back plane board 2 according to the first embodiment and FIG. 1B is a cross-sectional view of the photoelectric back plane board taken along line 1B—1B of FIG. 1A. As shown in FIGS. 1A through 2, the photoelectric back plane board 2 in the present embodiment comprises a multiple optical data bus fixing board 10 including a flat plate of synthetic resin, a plurality of optical data buses 30 fixed, respectively, within a plurality of (e.g. four (4) in the present embodiment) recesses for insertion of an optical data bus 14, which are formed in the surface of the multiple optical data bus fixing board 10, and a printed circuit board 40.

The multiple optical data bus fixing board 10 is removablly mounted on the printed circuit board 40 using screws or the like. On the surface of the printed circuit board 40 on which the multiple optical data bus fixing board 10 is mounted, a plurality of electrical connectors 42 (e.g. four (4) in the present embodiment) are fixed.

The multiple optical data bus fixing board 10 and the printed circuit board 40 are provided with through holes H for positioningly fixing a plurality of optical connectors 50 (see FIGS. 3A through 3D below) on the multiple optical data bus fixing board 10.

The electrical connectors 42 are provided for supplying power and performing signal input/output to/from after-mentioned circuit boards PK (see FIG. 4) which are mounted on the plurality of the optical connectors 50 positioningly fixed to the printed circuit board via the through holes.

On the printed circuit board 40, a wiring pattern for supplying power to the circuit board PK via the electrical connector 42 and a wiring pattern for inputting/outputting various control signals, such as synchronizing singals, to/from the circuit boards PK are formed. Furthermore, electronic components for generating supply voltage and various control signals to be supplied via these respective wiring patterns are mounted on the printed circuit board 40.

Figure 8A:
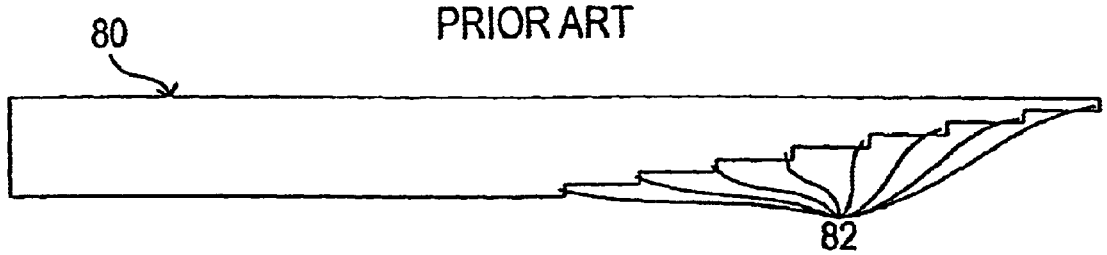
FIGS. 8A through 8C are explanatory views showing the structure and the state of use of a conventional optical data bus.
Figure 8B:
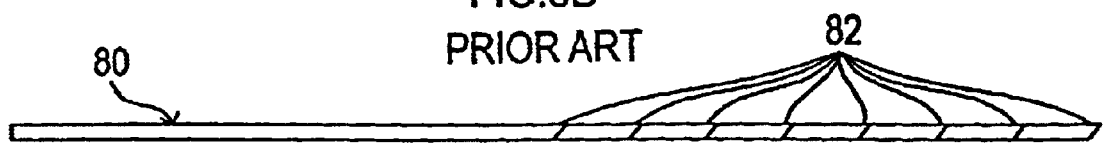
Figure 8C:
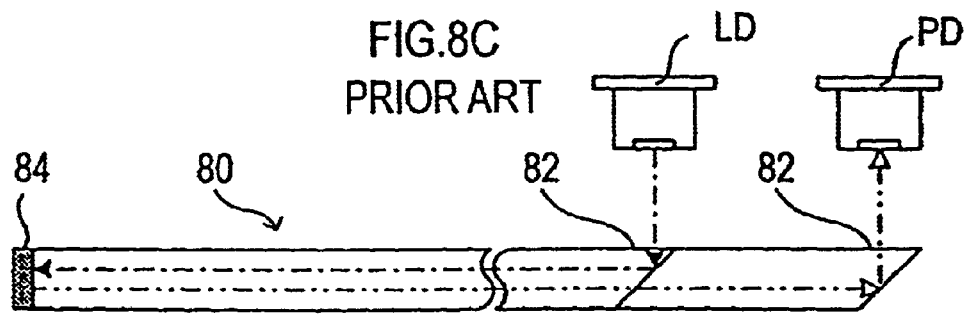
Figure 9A:
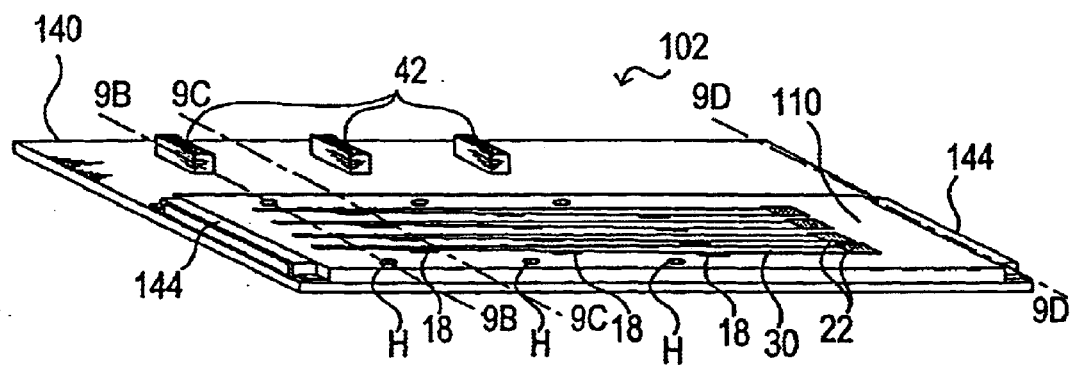
Figure 9B:
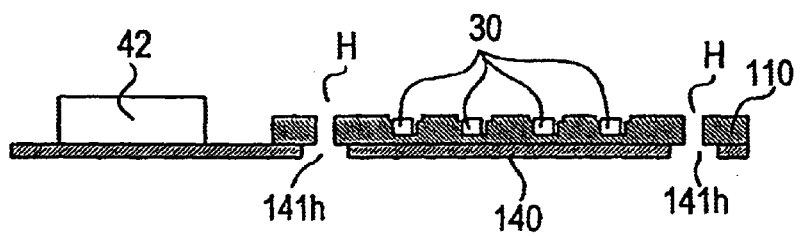
Figure 9C:
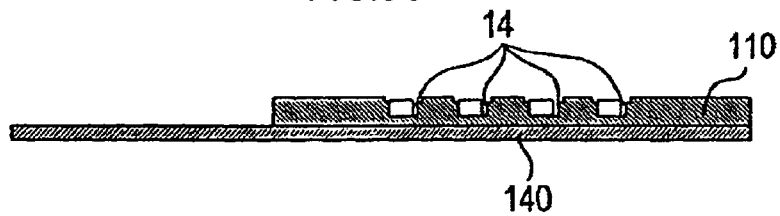
Figure 9D:
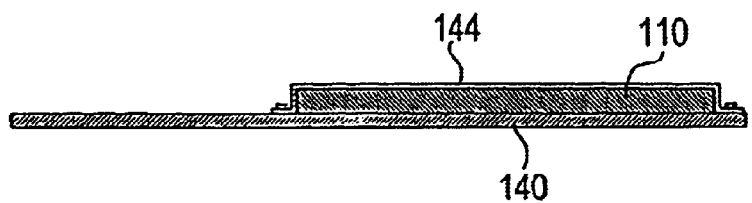
Figure 10A:
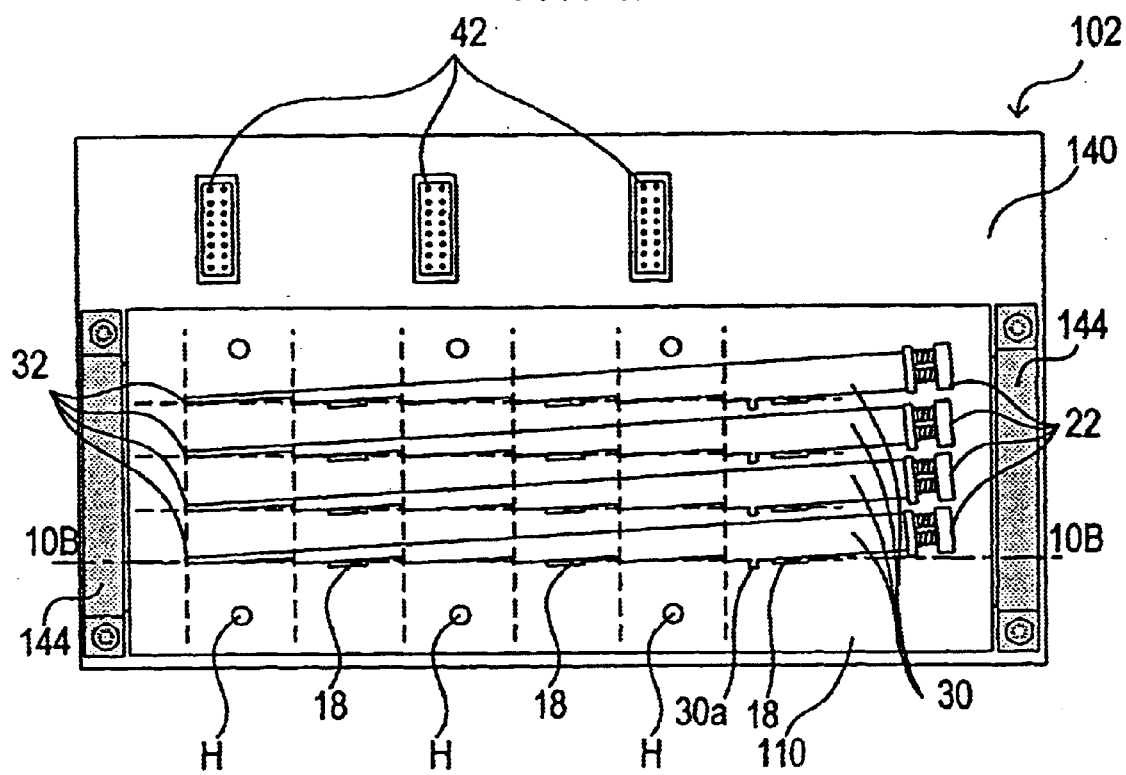
FIGS. 10A and 10B are a top plan view and a cress-sectional view along line 10B—10B in FIG. 10A, respectively, of the photoelectric back plane board according to the fifth embodiment.
Figure 10B:
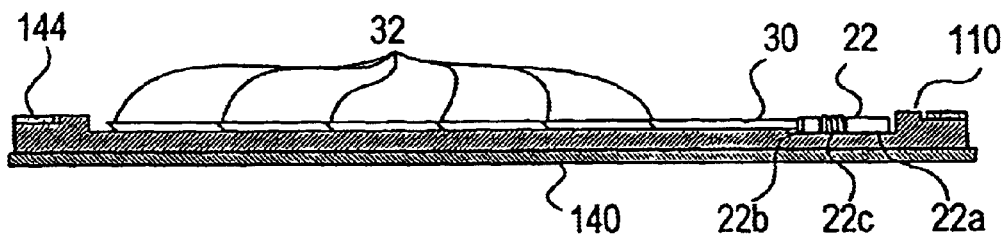

The optical data bus 30 has basically the same structure as an optical data bus 80 shown in FIGS. 8A through 8C. Specifically, the optical data bus 30 comprises a generally rectangular substrate of light transmissive resin having one longitudinal side thereof formed into a step-wise configuration, and each longitudinal end of each of the steps is sloped at 45 degrees in relation to the surface of the substrate in order to form a plurality of (e.g. eight (8) in the present embodiment) signal light incoming/outgoing areas 32. In addition, the side wall of the optical data bus 30 along the longitudinal direction is provided with a positioning projection 30a (see FIG. 2) for precisely positioning the optical data bus 30 within the recess for insertion of an optical data bus 14.

The recess for insertion of an optical data bus 14 has approximately the same configuration as the surface configuration of the optical data bus 30, which allows easy insertion of the optical data bus 30 into the recess. The recess for insertion of an optical data bus 14 also has a contour larger than the optical data bus 30 in order to avoid causing interference with the optical data bus 30 even when the optical data bus 30 is thermally expanded. The recess for insertion of an optical data bus 14 also has a greater length in the longitudinal direction than the optical data bus 30 so that a first holding member 22 can be disposed at the back end of the optical data bus 30 when the optical data bus 30 is inserted into the recess for insertion of an optical data bus 14.

As indicated by dashed lines in FIG. 2, the recesses for insertion of an optical data bus 14 are formed such that when the optical data buses 30 are inserted into the recesses for insertion of an optical data bus 14, respectively, the corresponding signal light incoming/outgoing areas 32 of the optical data buses 30 are aligned on a substantially straight line, and also the direction in which the signal light incoming/outgoing areas 32 of each optical data bus 30 are arranged is almost perpendicular to the straight line. In other words, all of the signal light incoming/outgoing areas 32 are arranged on an orthogonal grid along the outer shape of the multiple optical data bus fixing board 10. More specifically, the respective recesses for insertion of an optical data bus 14 are formed within the multiple optical data bus fixing board 10 so as to have their longitudinal central axes parallel to one another and also slanted at a certain angle with respect to the lateral edges of the multiple optical data bus fixing board 10.

The side wall along the longitudinal direction of the recess for insertion of an optical data bus 14 (the side wall corresponding to the longitudinal side of the optical data bus 30 formed into a step-wise configuration) is provided with: an engaging portion 14a for precisely positioning the optical data bus 30 by receiving the positioning projection 30a which protrudes from the side wall of the optical data bus 30 when the optical data bus 30 is inserted into the recess for insertion of an optical data bus 14, a second holding member fixing portion 14b for fixing a second holding member 18; and a warpage preventing member fixing portion 14c for fixing the warpage preventing member 20 which presses and biases the side wall of the top end portion of the optical data bus 30 on the side with the signal light incoming/outgoing areas 32.

The second holding member 18 is provided for sandwiching the optical data bus 30 with the aid of the opposite inner wall of the recess for insertion of an optical data bus 14 by pressing and biasing the side wall of the optical data bus 30 along the longitudinal direction with a flat spring, whereby the optical data bus 30 is securely held within the recess for insertion of an optical data bus 14.

The warpage preventing member 20, which is provided for preventing the top end portion of the optical data bus 30 from warping by pressing and biasing the side wall of the top end portion of the optical data bus 30, is a coil spring in the present embodiment. Since the optical data bus 30 is a resin substrate with one side having a step-wise configuration in order to form a plurality of signal light incoming/outgoing areas 32, the closer to the top end in the longitudinal direction of the step-wise configuration, the smaller the width of the optical data bus 30 becomes. Accordingly, the top end portion of the optical data bus 30 formed into a step-wise configuration tends to warp, for example, under the influence of heat, toward the side on which the signal light incoming/outgoing areas 32 are formed. Once the top end portion warps, incoming and outgoing of light through the signal light incoming/outgoing area 32 located at the top end portion cannot be performed properly. Thus, in the present embodiment, the warpage preventing member 20 comprising a coil spring is employed for pressing and biasing the side wall of the top end portion of the optical data bus 30, thereby to prevent the top end portion of the optical data bus 30 from warping.

The first holding member 22 to be disposed at the back end of the optical data bus 30 is inserted and fixed into the back end portion of the recess for insertion of the optical data bus 14 to hold the optical data bus 30 within the recess for insertion of the optical data bus 14 by pressing and biasing the end surface (back end surface) of the optical data bus 30 opposite to the signal light incoming/outgoing areas 32 in the direction of the top end portion having the signal light incoming/outgoing areas 32.

Specifically, the first holding member 22 comprises, as shown in FIG. 2, a main body 22a made of synthetic resin to be fixed into the back end portion of the recess for insertion of the optical data bus 14 with screws; a reflective diffusion plate 22b to which a light diffusion film, for example, a reflective diffusion sheet produced by Physical Optics Corporation, model No. LORS0.2×40PCB-MB is attached with its light reflective surface outward; and coil springs 22c provided between the main body 22a and the reflective diffusion plate 22b for abuttingly contacting the reflective diffusion plate 22b, or more specifically the reflective surface of the light diffusion film, with the back end surface of the optical data bus 30 and for pressing and biasing the optical data bus 30 from the back end toward the top end. The biasing force of the coil spring 22c serves to hold the optical data bus 30 within the recess for insertion of the optical data bus 14.

The through holes H for positioningly fixing the optical connectors 50 on the multiple optical data bus fixing board 10 are formed on both sides of the four optical data buses 30 arranged parallel to one another when inserted into the respective recesses for insertion of the optical data bus 14 such that the four optical data buses 30 are between each pair of the through holes H. The optical connectors 50 are fixed on the multiple optical data bus fixing board 10 so that the optical connectors 50 may cross over the four optical data buses 30 by being positioned by the through holes H.

Each of the optical connectors 50 has eight elements in total, that is, two elements in the longitudinal direction multiplied by four elements in the transverse direction of the respective optical data buses 30. Once the optical connector 50 is fixed on the multiple optical data bus fixing board 10, signal light is inputted/outputted using two adjoining sets of signal light incoming/outgoing areas 32 in the longitudinal direction of the optical data bus 30, each set consisting of four signal light incoming/outgoing areas 32 aligned on a straight line in the transverse direction of the optical data buses 30.

In the present embodiment, by fixing the optical connector 50 on the multiple optical date bus fixing board 10 so as to cross over the four optical data buses 30 in the transverse direction using the through holes H, the eight elements held by the optical connector 50 can be simultaneously positioned properly above the adjoining two signal light incoming/outgoing areas 32 of each of the four optical data buses 30.

Since the optical data bus 30 in the present embodiment is provided with eight signal light incoming/outgoing areas 32 substantially equally-spaced along the longitudinal direction, four through holes H are formed on each side of the four optical data buses 30 disposed in parallel.

Accordingly, the four optical connectors 50 are disposed above the respective optical data buses 30 using the four pairs of through holes H.

Although these through holes H are formed at the corresponding positions of the multiple optical data bus fixing board 10 and the printed circuit board 40 to allow later described rods 56 of the optical connector 50 to be inserted therethinto, the diameter of the through hole H in the printed circuit board 40 is slightly larger than the diameter of the through hole H in the multiple optical data bus fixing board 10. This is because the multiple optical data bus fixing board 10 and the printed circuit board 40 have different thermal expansion coefficients, and when the rods 56 are inserted and fixed in the through hole H in the multiple optical data bus fixing board 10, it is necessary to prevent the through hole H in the printed circuit board 40 from deviating and hindering the displacement of the rods 56.

Figure 3A:
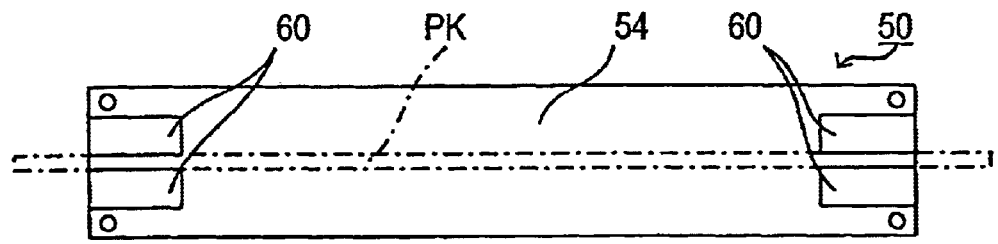
FIGS. 3A through 3D are explanatory views showing an optical connector to be mounted on the photoelectric back plane board according to the first embodiment.
Figure 3B:
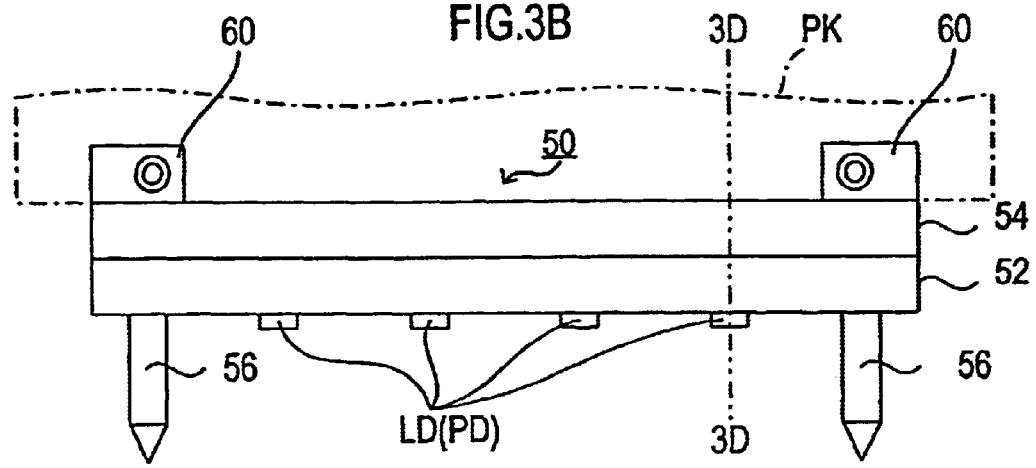
Figure 3C:
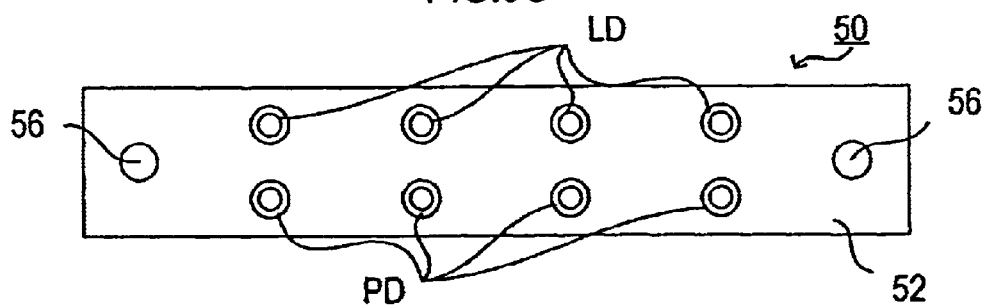
Figure 3D:
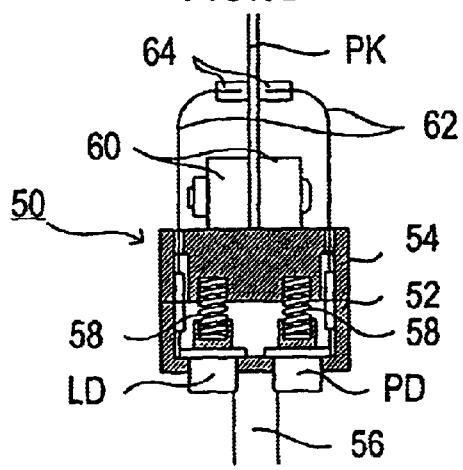

The structure of the optical connector 50 will now be described with reference to FIGS. 3A through 3D. FIG. 3A is a top plan view, FIG. 3B is a side elevation view, FIG. 3C is a bottom view, respectively, of the optical connector 50 and FIG. 3D is a cross sectional view showing the cross section of the optical connector 50 taken along line 3D—3D in FIG. 3B.

As shown in FIGS. 3A through 3D, the optical connector 50 comprises a lower case for housing the above-mentioned eight elements, i.e. four light emitting elements (e.g. laser diodes LD housed in a CAN package in the present embodiment) and four light receiving elements (e.g. photo diodes PD housed in a CAN package in the present embodiment), with their top ends for incoming/outgoing signal light protruding downward, and an upper case 54 to be fixed on the lower case 52 so as to close the upper opening of the lower case 52.

The lower case 52 comprises a long case with an opened upper portion and a bottom portion having eight element insertion holes for respectively positioning four laser diodes LD and four photo diodes PD. The element insertion holes are provided to form two rows along the longitudinal direction of the lower case 52, and the four laser diodes LD and the four photo diodes PD are inserted into the respective rows of element insertion holes such that the top ends of the elements for emitting/receiving signal lights face the outside. Since each element has a flange portion at its rear end, the element is prevented from coming off the lower case 52 when inserted into the element insertion hole. The bottom portion of the lower case 52 is provided, on both longitudinal sides, with a pair of rods 56 to be inserted into a pair of through holes H formed in the multiple optical data bus fixing board 10.

The upper case 54 for closing the upper opening of the lower case 52 is provided therewithin with coil springs 58 for biasing the laser diodes LD and the photo diodes PD positioned within the bottom portion of the lower case 52 from their rear ends toward the outside of the lower case 52. Accordingly, the laser diodes LD and the photo diodes PD held by the optical connector 50 is moved inside the optical connector 50 when the top surfaces of the laser diodes LD and the photo diodes PD protruding from the optical connector 50 touch an outside obstacle. The laser diodes LD and the photo diodes PD protrude again from the optical connector 50 once the top surfaces are freed from the obstacle.

The upper case 54 is also provided, on both longitudinal sides of its top surface, with a pair of board fixing portions 60 for erecting a circuit board PK for data communication using the laser diodes LD and the photo diodes PD held by the optical connector 50. The board fixing portion 60 comprising two members for sandwiching the board surfaces of the circuit board PK serves to mount the circuit board PK on the optical connector 50 by screwing the circuit board PK inserted between the two members.

Further, the upper case 54 is provided with signal line passage holes formed therein for leading signal lines 62, such as flat cables, connected to the leads of the laser diodes LD and the photo diodes PD above the optical connector 50, for electrically connecting the circuit board PK to the inside laser diodes LD and photo diodes PD. The signal lines 62 led through the holes are connected to the circuit for signal processing formed on the circuit board PK via connectors 64.

The above-mentioned plurality of or four electrical connectors 42 are arranged at certain positions, as shown in FIG. 2, such that when the optical connectors 50 are positioningly fixed to the multiple optical data bus fixing board 10 and accordingly to the printed circuit board 40 by means of the through holes H and then the circuit boards PK are mounted on the optical connectors 50, the electrical connectors 42 can be connected with the circuit boards PK via electrical connectors built in the circuit board PK or directly.

In the photoelectric back plane board 2 according to the present embodiment as described above, easy and precise relative positioning of the signal light incoming/outgoing areas 32 of the optical data bus 30 and the laser diodes LD or the photo diodes PD can be achieved by inserting and fixing the optical data bus 30 in the recess for insertion of an optical data bus 14 formed in the surface of the multiple optical data bus fixing board 10, and by positioningly fixing the optical connector 50 above the optical data bus 30 by means of the through holes H formed in the multiple optical data bus fixing board 10.

The multiple optical data bus fixing board 10 is removablly mounted on the printed circuit board 40 using screws or the like, and the electrical connectors 42 for supplying power and inputting/outputting various control signals, such as synchronizing signals, to/from the circuit board PK mounted on the optical connector 50 are fixed on the printed circuit board 40.

Thus, according to the photoelectric back plane board 2 of the present embodiment, not only the relative positioning of the signal light incoming/outgoing areas 32 of the optical data bus 30 and the laser diodes LD or the photo diodes PD is easily achieved, but also supplying power and inputting/outputting signals from the printed circuit board 40 to the circuit board PK mounted on the optical connector 50 is possible via the electrical connector 42.

The use of the photoelectric back plane board 2 in the present embodiment facilitates development of an information processing system which allows high-speed data communication among a plurality of circuit boards PK using optical data buses 30.

In the photoelectric back plane board 2 according to the present embodiment, the multiple optical data bus fixing board 10 is removablly mounted on the printed circuit board 40 as a base. Therefore, the optical data bus 30 can be replaced without directly touching the same by replacing the multiple optical data bus fixing board 10 with the optical data bus 30 fixed therewithin. This can prevents the optical data bus 30 from getting dirty or damaged while replacing the same, and thus leads to an improvement in efficiency of maintenance work.

The printed circuit board 40 and the multiple optical data bus fixing board 10 are constituted as separate components.

Accordingly, the material for the multiple optical data bus fixing board 10 may be selected so as to give the thermal expansion coefficient of the multiple optical data bus fixing board 10 equal to or approximately equal to the thermal expansion coefficient of the optical data bus 30.

In this case, the same degree of expansion of the multiple optical data bus fixing board 10 and the optical data bus 30 due to thermal change may be provided, and the optical connector 50, which is positioningly fixed to the multiple optical data bus fixing board 10, may be displaced corresponding to the thermal expansion of the same degree. Therefore, it is possible to prevent deterioration of communication performance due to the deviation of the relative position between the laser diodes LD and photo diodes PD within the optical connector 50, and the signal light incoming/outgoing areas 32 of the optical data bus 30 when a thermal change occurs.

As described above, the use of the photoelectric back plane board 2 in the present embodiment facilitates interconnection of a plurality of circuits without difficulty or causing transmission loss using an optical data bus 30 as a signal transmission medium. Therefore, an information processing system including a parallel architecture which supports speeding up of transmission and enables interconnection of multiple nodes with a simple structure can be achieved.

An example of information processing system constituted using the photoelectric back plane board 2 in the present embodiment will now be described with reference to FIG. 4. The information processing system, shown in FIG. 4, comprises a computer 70 and three hard disks 72, 74 and 76 to be connected with the computer 70, which are all information devices to be interconnected via the photoelectric back plane board 2. Cables for inputting/outputting data in accordance with the standards, such as SCSI and PCI, to/from the data bus of the mother board or of the add-in board connected with the mother board are led from the computer 70. In turn, cables for inputting/outputting data in accordance with the same standards are led from the hard disks 72 to 76.

The photoelectric back plane board 2 is fitted with four optical connectors 50 thereon, and circuit boards PK corresponding to the information devices, i.e. the computer 70 and the hard disks 72 to 76, are fixed on the board fixing portions 60 of the respective optical connectors 50.

These circuit boards PK operate by receiving power supply and various control signals from the printed circuit board 40 via the above-mentioned electrical connectors 42. Specifically, the circuit boards PK generate activating signals for activating the laser diodes LD within the optical connectors 50 in accordance with the output data from the corresponding information devices, i.e. the computer 70 or the hard disks 72 to 76, activate the laser diodes LD, convert the received light signals outputted from the photo diodes PD within the optical connectors 50 into data readable for the corresponding information devices, i.e. the computer 70 or the hard disks 72 to 76, then output the data to the corresponding information devices. IC 66 for signal processing and other electronic components are mounted on the surface of each circuit board.

A connector 68 for connecting with the cable for data transmission led from each of the respective information devices, i.e. the computer 70 and the hard disks 72 to 76, is provided at the end of each circuit board PK opposite to the optical connector 50. The circuit board PK and the corresponding information device, i.e. the computer 70 or the hard disks 72 to 76, are interconnected via the connector 68 and the cable as a signal line so as to enable data transmission therebetween.

The laser diodes LD and the photo diodes PD within the optical connectors 50 are connected with the corresponding circuit boards PK via the above-mentioned signal lines 62 as shown in FIG. 3D.

In the information processing system constituted as above, when data is outputted from the computer 70 or the hard disks 72 to 76 to the corresponding circuit board PK, the output data is signal processed by the circuit board PK, and the laser diode LD within the optical connector 50, on which the circuit board PK is fixed, is activated in accordance with the output data. As a result, the laser diode LD held within the optical connector 50 emits signal light corresponding to the output data and the signal light enters the signal light incoming/outgoing area 32 of the optical data bus 30.

The signal light which has entered the optical data bus 30 is transmitted through the optical data bus 30 toward the back end thereof, reflected by a reflective diffusion plate abutting the end surface of the optical data bus 30 by means of the first holding member 22, then returned to the top end of the optical data bus 30. The returned signal light is emitted from the signal light incoming/outgoing areas 32 of the optical data bus 30 in the upward direction of the optical data bus 30, enters the photo diodes PD disposed above the respective signal light incoming/outgoing areas 32, and is converted into electrical signals.

Then, the electrical signals are converted by the respective circuit boards PK into data to be transmitted to the corresponding information devices, i.e. the computer 70 or the hard disks 72 to 76. The converted data is inputted to the information devices, i.e. the computer 70 or the hard disks 72 to 76 via the cables.

Figure 4:
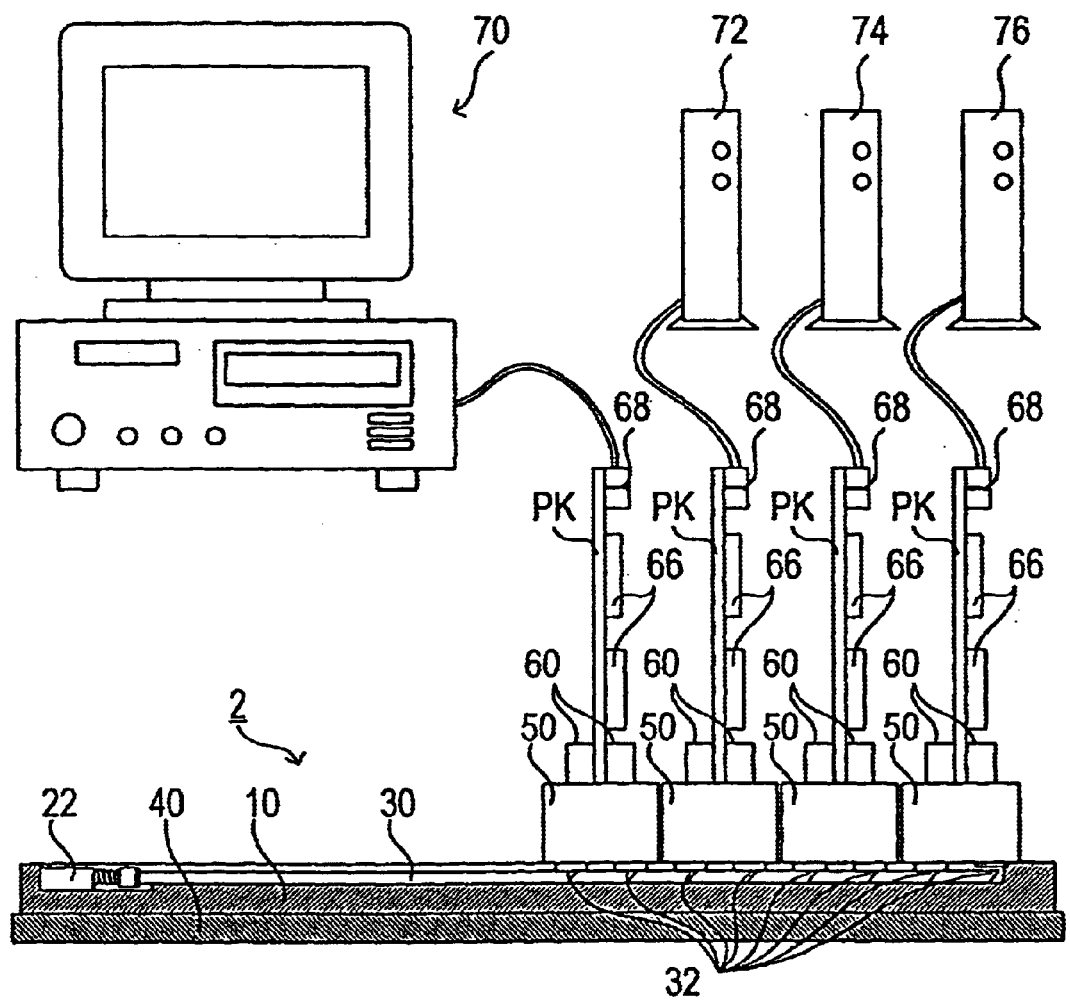
FIG. 4 is an explanatory view showing an example of an information processing system constituted using the photoelectric back plane board according to the first embodiment.

Specifically, in the information processing system shown in FIG. 4, when the computer 70 outputs certain data to the corresponding circuit boards PK in order to store or read data within the respective hard disks 72 to 76, the output data is transmitted to the respective hard disks 72 to 76, via the circuit boards PK, the laser diodes LD within the optical connectors 50, the photoelectric back plane board 2, more particularly the optical data bus 30, the photo diodes PD within the optical connectors 50, the circuit boards PK. In turn, the data is transmitted in response to the data requirement from the computer 70, through a reverse channel from the hard disk 72 to the computer 70.

In the information processing system shown in FIG. 4, data transmission between the computer 70 and the hard disks 72 to 76, or among the hard disks 72 to 76 is performed by using the photoelectric back plane board 2 which can efficiently transmit signal light. Therefore, an improvement in the quality of data transmission is achieved as compared with an information processing system in which a plurality of information devices are connected by means of electrical wiring. Also, data transmission at higher speed which electrical transmission can hardly achieve becomes available due to speeding up of the light emitting element and light receiving element.

The circuit board PK, which is fixed on the photoelectric back plane board 2 via the optical connector 50 in the present information processing system, may be fixed on and removed from the photoelectric back plane board 2 remaining mounted on the connector 50. Then, the fixing or removing operation of the circuit board PK can be substantially easily performed.

At the same time that the circuit board PK is fixed on the photoelectric back plane board 2 via the optical connector 50, the circuit board PK is also connected with the printed circuit board 40 via the electrical connector 42 fixed on the photoelectric back plane board 2 (more particularly, on the printed circuit board 40) and is supplied with power and various control signals by the printed circuit board 40. Thus, wiring for power supply and signal input/output to/from the circuit board PK is unnecessary, which also facilitates easier fixing/removing operation of the circuit board PK to the photoelectric back plane board 2.

In the present embodiment, there is described the photoelectric back plane board 2 wherein the multiple optical data bus fixing board 10 is mounted on a printed circuit board 40 on which the electrical connectors 42 are fixed, so that positioning of the optical data bus 30 and the optical connector 50, more specifically the laser diode LD and photo diode PD, connection between the printed circuit board 40 and the circuit board PK, and the like are easily obtained. However, it is not always necessary to use the multiple optical data bus fixing board 10 in order to have the same effect as in the present embodiment.

Second Embodiment

Another embodiment of the present invention is a photoelectric back plane board constituted without using the above multiple optical data bus fixing board 10.

FIGS. 5A and 5B show the structure of a photoelectric back plane board 2a according to a second embodiment using an optical data bus guide plate 100a instead of the multiple optical data bus fixing board 10. FIG. 5A is a perspective view of the photoelectric back plane board 2a and FIG. 5B is a cross sectional view of the photoelectric back plane board 2a taken along the line 5B—5B in FIG. 5A.

Since the structure of the photoelectric back plane board 2a is the same as shown in FIGS. 1A and 1B except the optical data bus guide plate 10a, only different features will be explained below.

The optical data bus guide plate 10a comprises a plate having approximately the same thickness as an optical data bus 30. The plate is provided with a plurality of through guide holes 14a formed corresponding to the contour of the optical data bus 30, similarly to the recess for insertion of an optical data bus 14 in the multiple optical data bus fixing board 10.

The optical data bus guide plate 10a is mounted on a printed circuit board 40 in the same manner as the multiple optical data bus fixing board 10, and the optical data bus 30 is inserted and fixed in a recess for insertion of an optical data bus which is formed by the guide hole 14a of the optical data bus guide plate 10a and the upper surface of the printed circuit board 40.

The optical data bus guide plate 10a is provided with through holes H for positioningly fixing optical connectors 50, and the printed circuit board 40 is also provided with through holes H at the corresponding positions in the same manner as in the multiple optical data bus fixing board 10.

By this, in the photoelectric back plane board 2a according to the second embodiment as in the first embodiment shown in FIGS. 1A and 1B, not only the relative positioning of the signal light incoming/outgoing areas 32 of the optical data bus 30 and the laser diodes LD or the photo diodes PD is easily achieved, but also supplying power and inputting/outputting signals from the printed circuit board 40 to the circuit board PK mounted on the optical connector 50 is enabled via the electrical connector 42. Therefore, it is possible to construct an information processing system by which high-speed data communication among a plurality of circuit boards PK using optical data buses 30 is achieved.

Since the printed circuit board 40 and the optical data bus guide plate 10a are constituted as separate components, the material for the optical data bus guide plate 10a may be selected so as to give the thermal expansion coefficient of the optical data bus guide plate 10a equal to or approximately equal to the thermal expansion coefficient of the optical data bus 30 as in the first embodiment. In this case, the same degree of expansion of the optical data bus guide plate 10a and the optical data bus 30 due to thermal change may be provided, and the optical connector 50, which is positioningly fixed to the optical data bus guide plate 10a, may be displaced corresponding to the thermal expansion of the same degree. Therefore, it is possible to prevent deterioration of communication performance due to the deviation of the relative position between the laser diodes LD and photo diodes PD within the optical connector 50, and the signal light incoming/outgoing areas 32 of the optical data bus 30 when a thermal change occurs.

In the case of the photoelectric back plane board 2a according to the second embodiment, the optical data bus 30 which is inserted into the guide hole 14a formed in the optical data bus guide plate 10a is to be replaced individually, unlike the first embodiment.

Third Embodiment

Figure 6A:
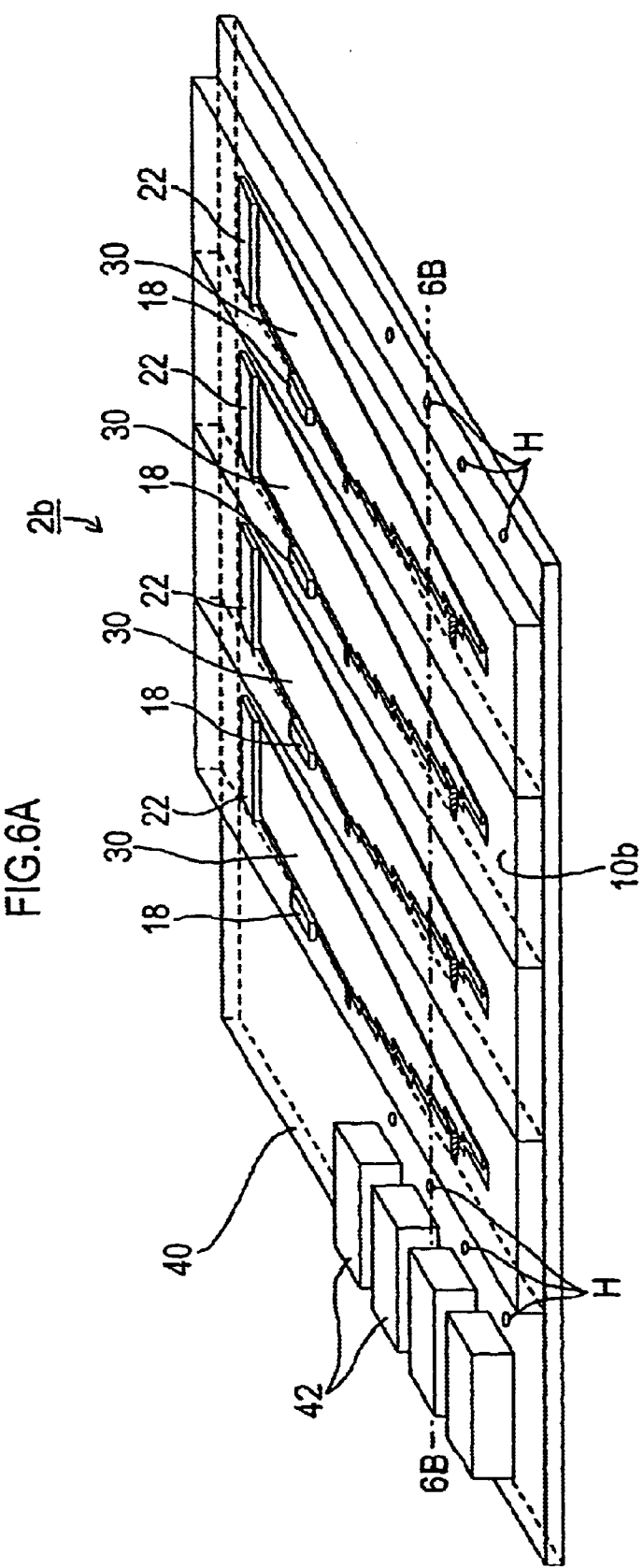
FIGS. 6A and 6B are explanatory views showing the entire structure of a photoelectric back plane board according a third embodiment.
Figure 6B:
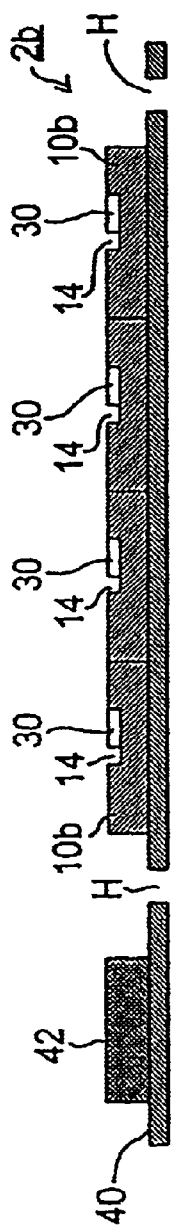

FIGS. 6A and 6B show the structure of a photoelectric back plane board 2b according to a third embodiment in which a plurality of single optical data bus fixing boards 10b having a single recess for insertion of an optical data bus are employed instead of the multiple optical data bus fixing board 10. FIG. 6A is a perspective view of the photoelectric back plane board 2b, and FIG. 6B is a cross-sectional view of the photoelectric back plane board 2b taken along line 6B—6B in FIG. 6A.

Since the structure of the photoelectric back plane board 2b is the same as shown in FIG. 1 except the single optical data bus fixing board lob, only different features will be explained below.

The single optical data bus fixing board 10b is formed such that a row of a plurality of the single optical data bus fixing boards 10b each having a recess for insertion of an optical data bus 14 constitute the multiple optical data bus fixing board 10. The respective single optical data bus fixing boards 10b are disposed on a printed circuit board 40 so that the corresponding signal light incoming/outgoing areas 32 of the optical data buses 30 fixed within the recesses for insertion of an optical data bus 14 are aligned on the respective substantially straight lines.

The printed circuit board 40 is provided with through holes H for positioningly fixing optical connectors 50, and electrical connectors 42 for supplying power and inputting/outputting various control signals to the circuit boards PK mounted on the optical connectors 50, which are positioned via the through holes H, are fixed on the surface of the printed circuit board 40 on which the single optical data bus fixing boards lob are stacked in layers.

By this, in the photoelectric back plane board 2b according to the second embodiment as in the first embodiment shown in FIGS. 1A and 1B, not only the relative positioning of the signal light incoming/outgoing areas 32 of the optical data bus 30 and the laser diodes LD or the photo diodes PD is easily achieved, but also supplying power and inputting/outputting signals from the printed circuit board 40 to the circuit board PK mounted on the optical connector 50 is enabled via the electrical connector 42. Therefore, it is possible to construct an information processing system by which high-speed data communication among a plurality of circuit boards PK using optical data buses 30 is achieved.

The single optical data bus fixing board 10b in the photoelectric back plane board 2b according to the third embodiment is removablly mounted on the printed circuit board 40 as a base. Therefore, the optical data bus 30 can be replaced without directly touching the same by replacing the single optical data bus fixing board lob with the optical data bus 30 fixed therewithin. This can prevents the optical data bus 30 from getting dirty or damaged while replacing the same, and leads to improvement in efficiency of maintenance work.

Fourth Embodiment

FIGS. 7A and 7B show a photoelectric back plane board 2c according to a fourth embodiment, wherein optical data buses 30 can be fixed on a printed circuit board 40 without using an optical data bus fixing member, such as the multiple or single optical data bus fixing board 10, 10b, or the optical data bus guide plate 10a as described above. FIG. 7A is a perspective view of the photoelectric back plane board 2c and FIG. 7B is a cross-sectional view of the photoelectric back plane board 2c taken along line 7B—7B in FIG. 7A.

Since the structure of the photoelectric back plane board 2c is the same as in the above described embodiments except that no optical data bus fixing member is used and that the printed circuit board 40 has a different, only different features will be explained below.

In the photoelectric back plane board 2c according to the fourth embodiment, shown in FIGS. 7A and 7B, a plurality of recesses for insertion of an optical data bus 14, which are formed in the multiple optical data bus fixing board 10 according to the first embodiment, are formed directly in the printed circuit board 40. Arrangement of the respective recesses for insertion of an optical data bus 14 on the printed circuit board 40 is entirely the same as the arrangement on the multiple optical data bus fixing board 10.

The printed circuit board 40 is provided with through holes H for positioningly fixing optical connectors 50, and electrical connectors 42 for supplying power and inputting/outputting various control signals to the circuit boards PK mounted on the optical connectors 50, which are positioned via the through holes H, are fixed on the surface of the printed circuit board 40 in which the recesses for insertion of an optical data bus 14 are formed.

By this, in the photoelectric back plane board 2c according to present embodiment as in the above described embodiments, not only the relative positioning of the signal light incoming/outgoing areas 32 of the optical data bus 30 and the laser diodes LD or the photo diodes PD is easily achieved, but also supplying power and inputting/outputting signals from the printed circuit board 40 to the circuit board PK mounted on the optical connector 50 is enabled via the electrical connector 42. Therefore, it is possible to construct an information processing system by which high-speed data communication among a plurality of circuit boards PK using optical data buses 30 is achieved.

In the case of the photoelectric back plane board 2c according to the fourth embodiment, the optical data bus 30, which is inserted into the recess for insertion of an optical data bus 14 formed in the printed circuit board 40, is to be replaced individually.

While a single second holding member 18 is provided for an optical data bus 30 in the above embodiments, a plurality of second holding members 18 may be provided as shown in the following embodiment.

Fifth Embodiment

As shown in FIGS. 9A–9D, 10A, 10B, 11A and 11B, in a photoelectric back plane board 102 according to a fifth embodiment of the present invention, an optical data bus fixing board 110 is positioningly fixed on a printed circuit board 140 with after-mentioned bushes 146 and pins 148, and a pair of guide rails 144 so as to be extendable in the longitudinal direction of an optical data bus 30. On the surface of the printed circuit board 140 on which the optical data bus fixing board 110 is mounted, a plurality of (e.g. three (3) in the present embodiment) electrical connectors 42 are fixed.

The optical data bus fixing board 110 is provided with through holes H formed for positioningly fixing the optical connectors 50, while the printed circuit board 140 is provided with through holes 141h corresponding to the through holes H.

Figure 12:
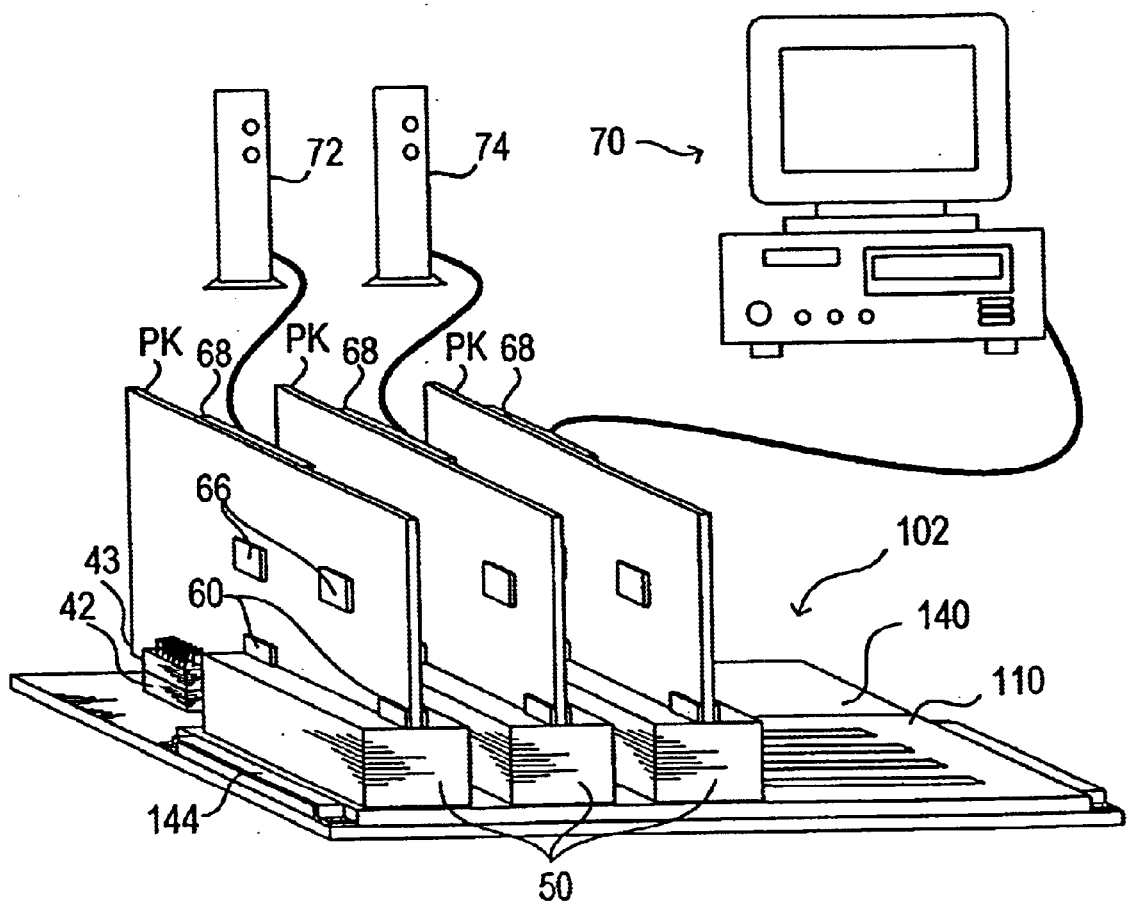
FIG. 12 is an explanatory view showing an example of an information processing system constituted using the photoelectric back plane board according to the fifth embodiment.

In the present embodiment, in the same manner as in the first through fourth embodiments, an electrical connector 43 is built in each circuit board PK. An information processing system constituted using a photoelectric back plane board 102 according to the present embodiment is shown in FIG. 12.

The procedure of fixation of the optical data bus fixing board 110 on the printed circuit board 140 is as shown in FIG. 11A and FIG. 11B, i.e. an enlarged view of the portion for positioning. First, the bush 146 with a hole at the center thereof is fitted in a through hole 141b for fitting a bush formed in the printed circuit board 140, while the pin 148 is fitted in the optical data bus fixing board 110. By inserting the pin 148 into the hole in the bush 146, the optical data bus fixing board 110 and the printed circuit board 140 are properly positioned. Then, guide rails 144 are placed over both longitudinal end portions of the optical data bus fixing board 110, more particularly the both end portions corresponding to the longitudinal end portions of the optical data buses 30. The guide rails 144 are fixed directly on the printed circuit board 140 by means of screw holes 141g for fixing a guide rail formed in the printed circuit board 140.

The printed circuit board 140 is provided with a pair of through holes 141b for fitting a bush formed on a straight line substantially perpendicular to the longitudinal direction of the optical data bus 30, or along the direction of arranging the optical data buses 30. The printed circuit board 140 and the optical data bus fixing board 110 are properly positioned by means of a pair of bushes 146 fitted in the pair of through holes 141b and a pair of pins 148 corresponding to the bushes 146 at two points on the straight line substantially perpendicular to the longitudinal direction of the optical data bus 30.

Accordingly, even when a change of the ambient temperature causes a greater expansion of the optical data bus fixing board 110 than the expansion of the printed circuit board 140 due to the difference in thermal expansion coefficient between the optical data bus fixing board 110 and the printed circuit board 140, the optical data bus fixing board 110 can expand or contract freely along the longitudinal direction with a central focus on the portion for positioning.

The guide rails 144 cover the both longitudinal ends of the optical data bus fixing board 110 from above and press the optical data bus fixing board 110 against the printed circuit board 140, with the result that the optical data bus fixing board 110 is fixed on the printed circuit board 140 while being allowed to expand in the longitudinal direction. The both longitudinal end portions of the optical data bus fixing board 110 are formed corresponding to the configuration of the guide rail 144 to have a smaller thickness and a smaller short side length, i.e. the length in the direction of arranging the optical data buses 30, as compared with the center portion of the optical data bus fixing board 110 so that the end portions can be easily covered by the guide rails 144. The guide rails 144 are screwed directly to the printed circuit board 140 at both ends of the guide rails 144 along the short side direction of the optical data bus fixing board 110.

The optical data bus fixing board 110 in the photoelectric back plane board 102 according to the present embodiment is removablly mounted on the printed circuit board 140 as a base. Therefore, the optical data bus 30 can be replaced without directly touching the same by replacing the optical data bus fixing board 110 with the optical data bus 30 fixed therewithin. This can prevents the optical data bus 30 from getting dirty or damaged while replacing the same, and leads to improvement in efficiency of maintenance work.

While the printed circuit board 140 and the optical data bus fixing board 110 are properly positioned by means of a pair of positioning members each consisting of a bush 146 and a pin 148 at two points on the straight line substantially perpendicular to the longitudinal direction of the optical data bus fixing board 110, the printed circuit board 140 and the optical data bus fixing board 110 may be properly positioned at one point in the substantial center of the optical data bus fixing board 110.

While the guide rails 144 are placed over the both longitudinal end portions of the optical data bus fixing board 110, only one guide rail 144 may be sufficient as long as the guide rail 144 serves to press and properly position the optical data bus fixing board 110 against the printed circuit board 140.

Sixth Embodiment

Figure 13A:
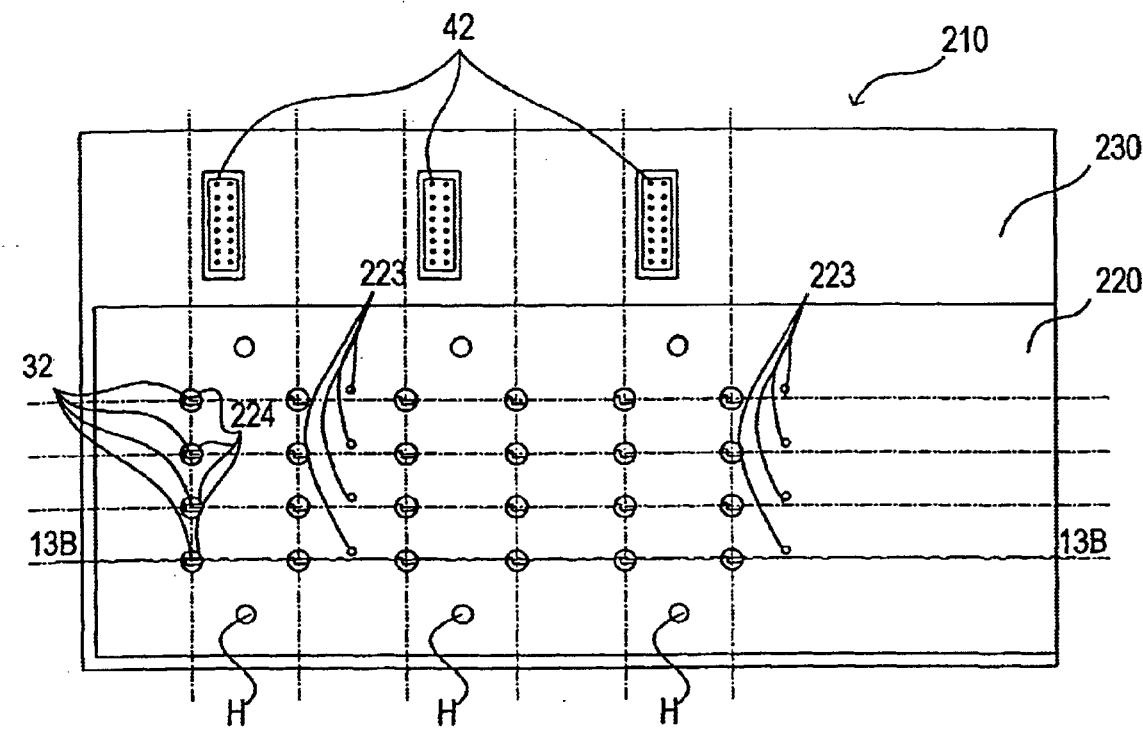
FIGS. 13A and 13B are a top plan view and a cress-sectional view along line 13B—13B in FIG. 13A, respectively, of the photoelectric back plane board according to a sixth embodiment.
Figure 13B:
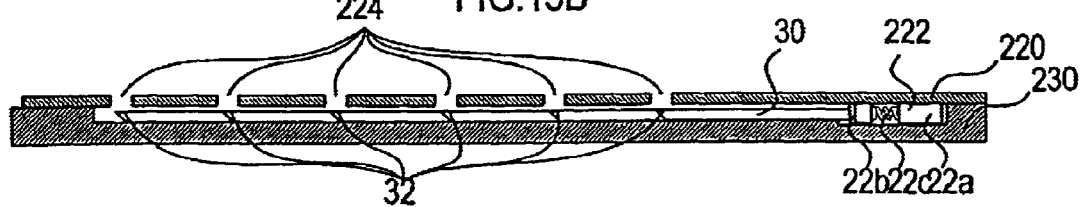

As shown in FIGS. 13A, 13B and 14, a photoelectric back plane board 210 according to a sixth embodiment of the present invention comprises a lid 220 including a flat plate of synthetic resin, a printed circuit board 230, and a plurality of (e.g. four (4) in the present embodiment) optical data buses 30.

The lid 220 is disposed over the printed circuit board 230, and a plurality of (e.g. three (3) in the present embodiment) electrical connectors 42 are fixed on the surface of the printed circuit board 230 on which the lid 220 is disposed.

The lid 220 is provided with optical connector fixing holes H formed for positioningly fixing a plurality of optical connectors 50 on the lid 220.

The optical data bus 30 is provided, on the surface thereof, with positioning projections 30b for properly positioning the optical data bus 30 with respect to optical data bus fixing holes 223 formed in the lid 220. The diameter of the optical data bus fixing holes 223 formed in the lid 220 is approximately the same as the diameter of the positioning projections 30b of the optical data bus 30.

The lid 220 is also provided with element package passage holes 224 larger than the contour of the package of a light emitting element or a light receiving element corresponding to a signal light incoming/outgoing area 32 of the optical data bus 30, so that the signal light incoming/outgoing area 32 can be seen from above when the positioning projections 30b of the optical data bus 30 are fitted in the respective optical data bus fixing holes 223. This enables the light emitting elements and the light receiving elements protruding from the optical connectors 50 to abut the signal light incoming/outgoing areas 32 of the optical data buses 30 when the photoelectric back plane board 210 is assembled and then the optical connectors 50 are fixed on the photoelectric back plane board 210 as shown in FIG. 14.

Furthermore, the lid 220 is provided with holding members 222 for pressing and biasing the end surface or the back end surface opposite to the signal light incoming/outgoing areas 32 toward the top end portion of the optical data bus 30 with the signal light incoming/outgoing areas 32 when the positioning projections 30b of the optical data bus 30 are fitted in the respective optical data bus fixing holes 223.

The optical connector fixing holes H for positioiningly fixing the optical connectors 50 on the lid 220 are formed so as to be located on both sides of the four optical data buses 30 which are arranged parallel to one another by fitting the positioning projections 30b of the respective optical data buses 30 in the optical data bus fixing holes 223. The optical connectors 50 properly positioned by the optical connector fixing holes H are fixed on the lid 220 so as to cross over the four optical data buses 30. The thickness of the lid 220 within the area (hereinafter referred to as a leg portion 225), in which the optical connector fixing holes H are formed, is greater than the thickness in the rest.

The printed circuit board 230 is provided with a recess for insertion of optical data buses 233, electrical connectors 42, and grooves 232 corresponding to the leg portion 225 provided for the lid 220.

As shown in FIG. 14, the configuration of the recess for insertion of optical data buses 233 of the printed circuit board 230 is larger than the contour of the optical data bus 30 so that the recess for insertion of optical data buses 233 will allow the optical data bus 30 to be easily inserted and will not interfere with the optical data bus 30 even when the optical data bus 30 expands with heat. The recess for insertion of optical data buses 233 also has a greater length in the longitudinal direction than the length of the optical data bus 30 so as not to interfere with the holding members 222 provided for the lid 220.

Seventh Embodiment

Figure 15:
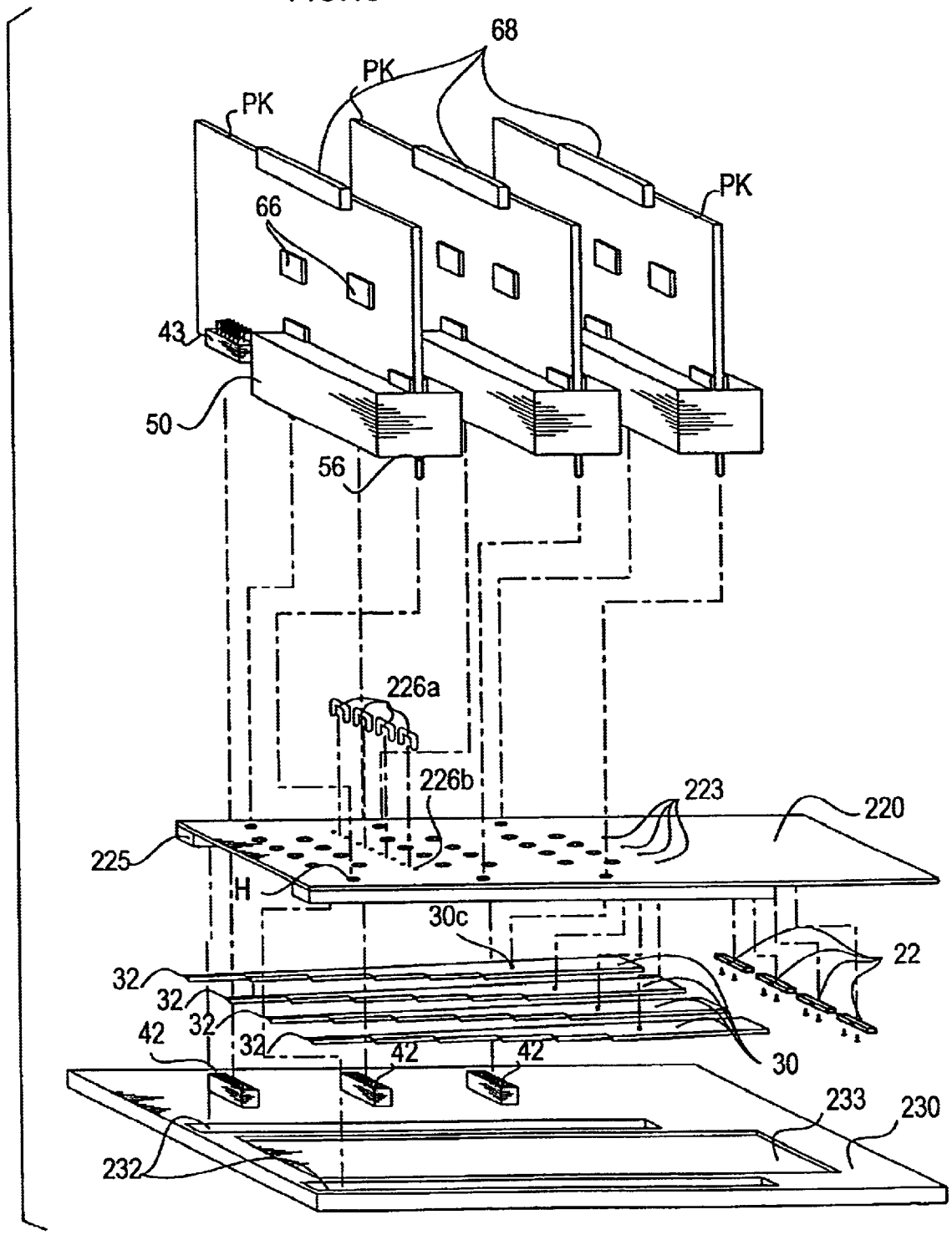
FIG. 15 is an exploded view of the photoelectric back plane board according to a seventh embodiment.

In the present embodiment, as shown in FIG. 15, an optical data bus 30 is provided with a positioning projection 30c for properly positioning the optical data bus 30 with respect to an optical data bus fixing hole 223 provided for a lid 220.

The lid 220 has optical data bus fixing portions 226 constituted by fixing member insertion holes 226b and fixing members 226a having a substantially reverse U-shaped configuration and inserted into the fixing member insertion holes 226b.

The respective optical data bus fixing holes 223 and the respective fixing member insertion holes 226b are formed such that when the positioning projection 30c of the optical data buses 30 are fitted in the optical data bus fixing holes 223 and the direction of arranging the optical data buses 30 are fixed by the fixing members 226a, corresponding signal light incoming/outgoing areas 32 of the respective optical data buses 30 are aligned on respective substantially straight lines and the direction of arranging the signal light incoming/outgoing areas 32 within the respective optical data buses 30 is substantially perpendicular to the straight lines. In other words, all of the signal light incoming/outgoing areas 32 are formed to be arranged on an orthogonal grid along the outer shape of the lid 220.

Eighth Embodiment

Figure 16B:
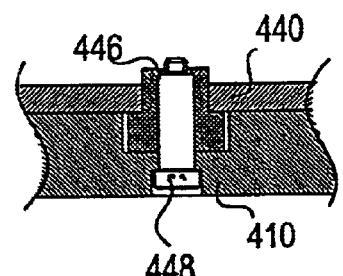
FIG. 16A is an exploded view of the photoelectric back plane board according to an eighth embodiment and FIG. 16B is an enlarged view of a portion for positioning in the photoelectric back plane board.
Figure 16A:
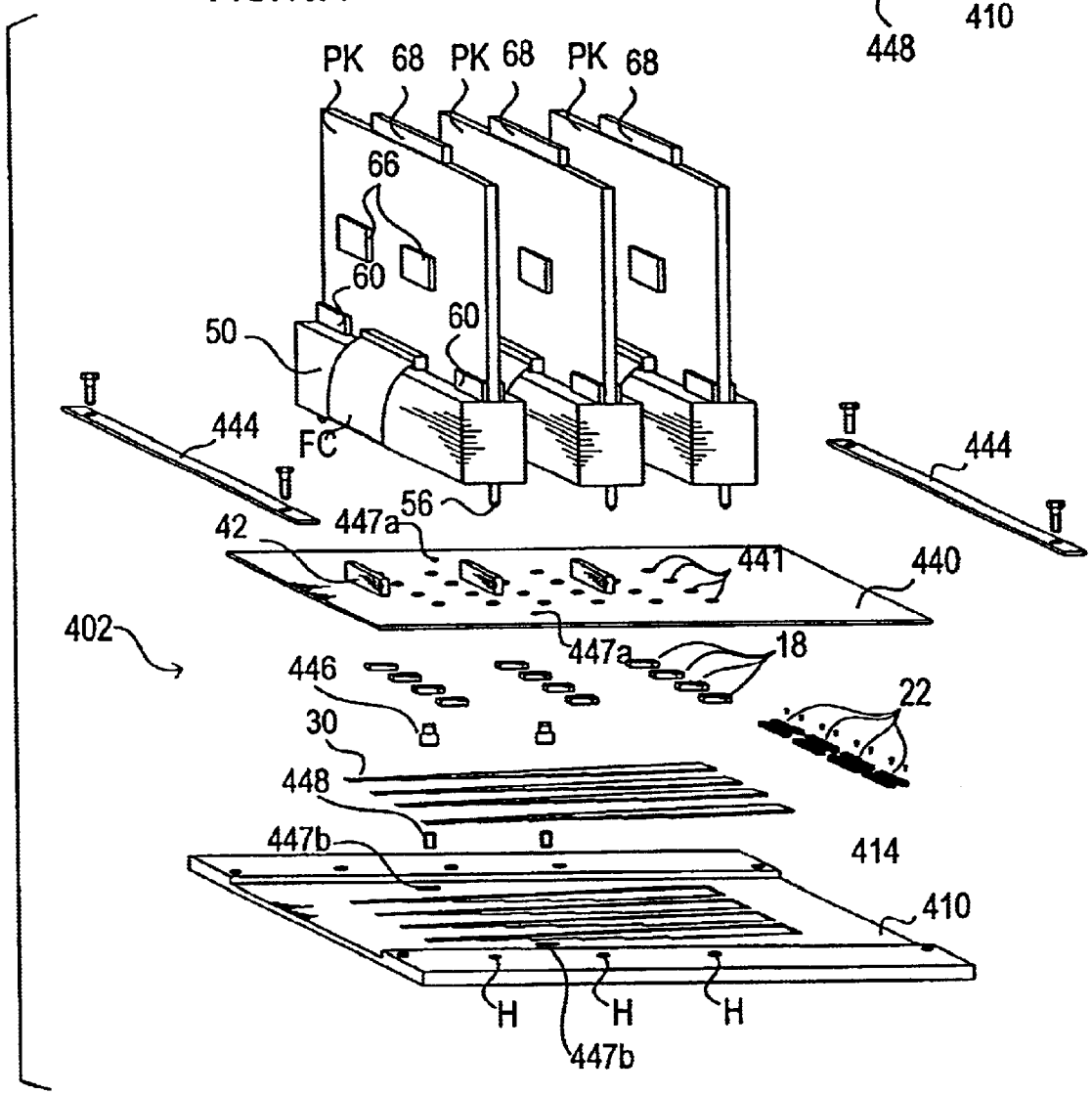

As shown in FIGS. 16A and 16B, a photoelectric back plane board 402 according to the present embodiment comprises an optical data bus fixing board 410 including a flat plate of synthetic resin, a plurality of optical data buses 30 fixed, respectively, within a plurality of (e.g. four (4) in the present embodiment) recesses for insertion of an optical data bus 414, which are formed in the surface of the optical data bus fixing board 410, and a printed circuit board 440.

The printed circuit board 440 is positioningly fixed on the optical data bus fixing board 410 with bushes 446 and pins 448, and a pair of guide rails 444. The printed circuit board 440 and the optical data bus fixing board 410 are adapted to independently expand or contract along the longitudinal direction of the optical data bus 30 with a central focus on the joint portion constituted by the bushes 446 and the pins 448. A plurality of (e.g. three (3) in the present embodiment) electrical connectors 42 are fixed on the surface of the printed circuit board 440 opposite to the optical data bus fixing board 410.

The optical data bus fixing board 410 is provided with through holes H for positioningly fixing a plurality of optical connectors 50 on the optical data bus fixing board 410.

Ninth Embodiment

Figure 17A:
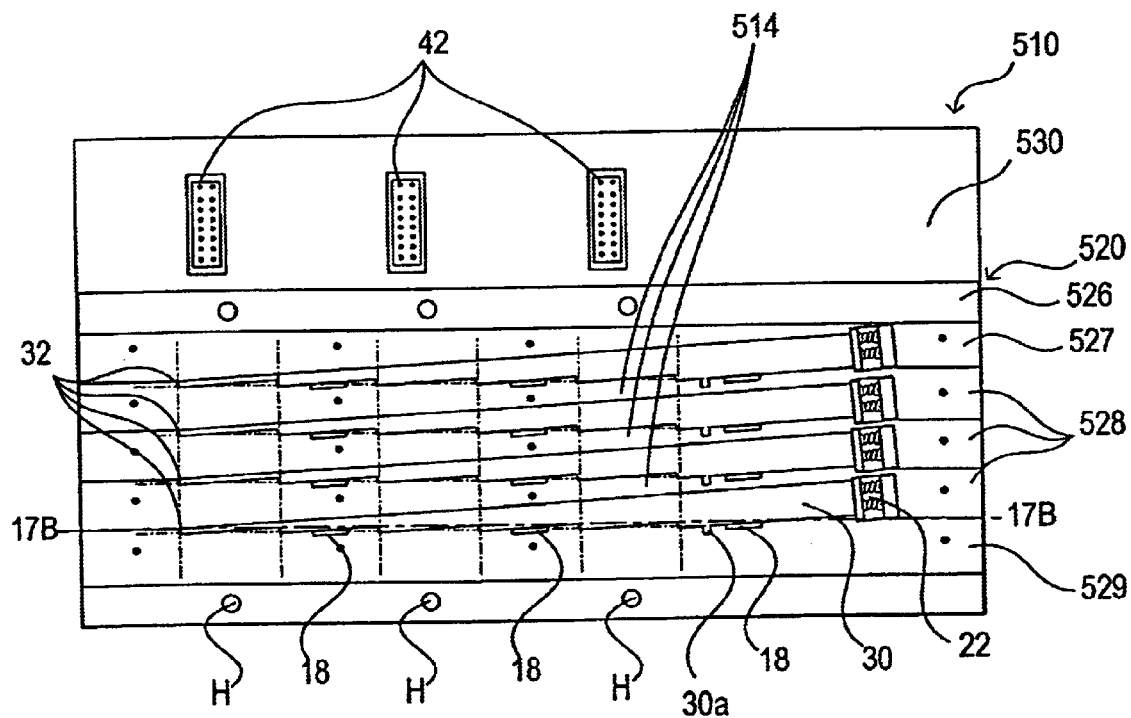
FIGS. 17A and 17B are a top plan view and a cress-sectional view along line 17B—17B in FIG. 17A, respectively, of the photoelectric back plane board according to a ninth embodiment.
Figure 17B:
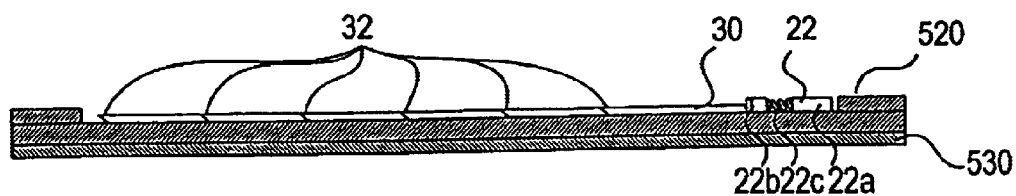
Figure 18:
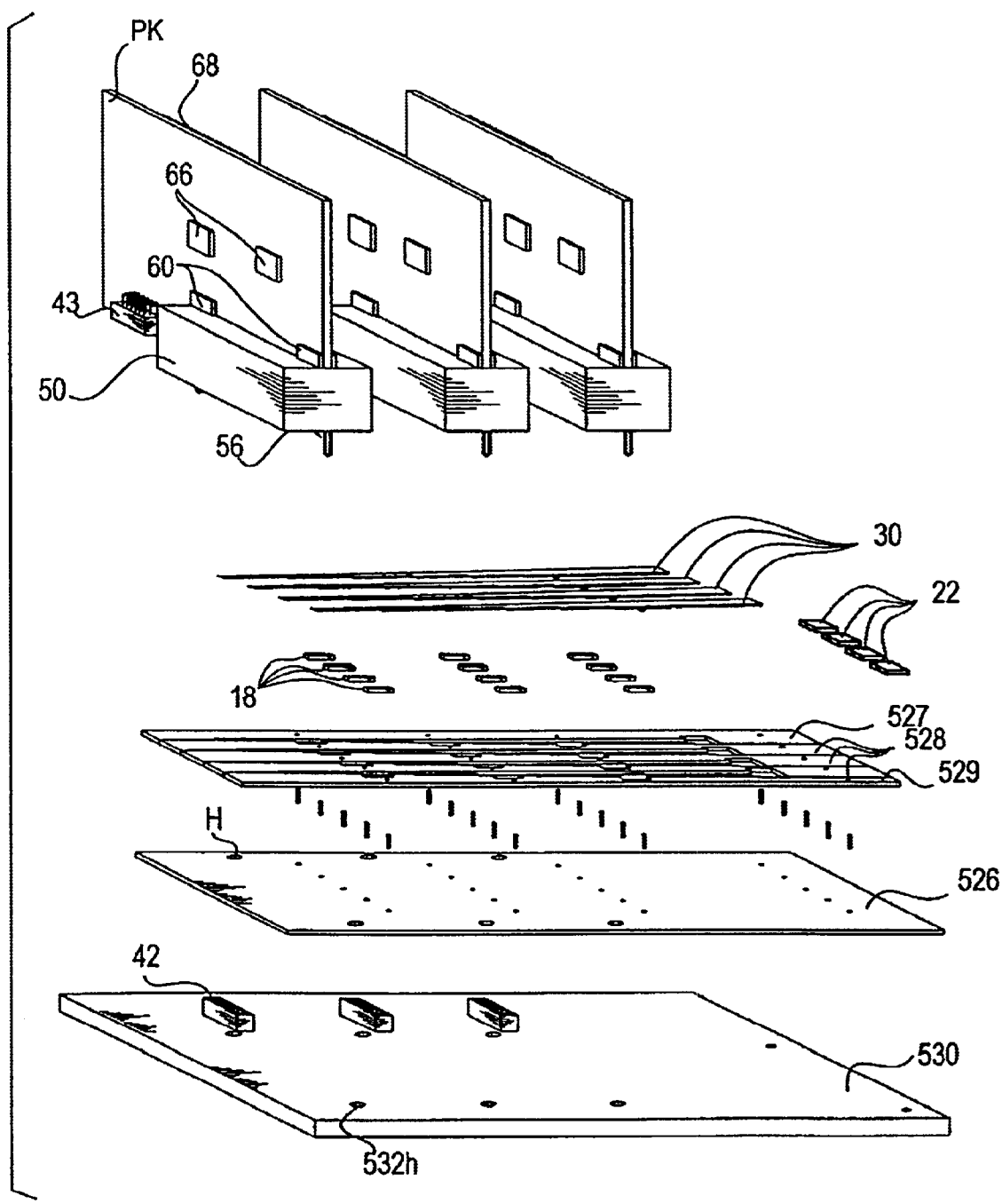
FIG. 18 is an exploded view of the photoelectric back plane board according to the ninth embodiment.

In the present embodiment, as shown in FIGS. 17A, 17B and 18, recesses for insertion of an optical data bus 514 are formed by fixing three kinds of flat plates 527–529, which include a plate material having substantially the same thickness as an optical data bus 30 and correspond to the surface configuration of the optical data bus, on a flat plate 526 as a base for an optical data bus fixing board. Positioning of the flat plates 527–529 with respect to the flat plate 526 is performed by previously providing positioning holes in the flat plates 526–529 and inserting pins into the positioning holes in the flat plate 526, then inserting the pins into the positioning holes in the flat plates 527–529.

The flat plate 526 is provided with through holes H for fixing optical connectors 50, while through holes 532$h$ corresponding to the through holes H are provided in a printed circuit board 530 on which the flat plate is disposed.

Although the present invention has been described with reference to some preferred embodiments, the present invention should not be limited to the embodiments but may be embodied in various forms.

What is claimed is:

1. A photoelectric back plane board, comprising:
    a plurality of optical data buses made of a long plate of light transmissive material having a configuration including a longitudinal side formed into a plurality of steps at intervals such that light emitting elements and light receiving elements may be arranged between a first and second end of the optical data bus, the plurality of steps defining signal light incoming/outgoing areas formed by sloping a longitudinal end of each of the plurality of steps at approximately 45 degrees in relation to a surface of the optical data bus;
    a multiple optical data bus fixing board provided with a plurality of recesses for insertion of an optical data bus having a contour corresponding to the configuration of the optical data bus, the recesses for insertion of an optical data bus being formed at approximately the same intervals so that when the respective optical data buses are inserted into the recesses for insertion of an optical data bus, the corresponding signal light incoming and outgoing areas of the respective optical data buses may be aligned on substantially straight lines, respectively; and
    a printed circuit board on which the multiple optical data bus fixing board with the respective recesses for insertion of an optical data bus in which respective optical data buses are inserted and fixed is removablly mounted, and on the surface of which a plurality of electrical connectors are fixed for supplying power or inputting/outputting signals to a plurality of circuit boards performing optical communication therebetween via the respective optical data buses inserted and fixed in the recesses for insertion of an optical data bus, the printed circuit board supplying power or inputting/outputting signals to the respective circuit board via the respective electrical connectors,
    wherein the printed circuit board is, or both of the printed circuit board and the multiple optical data bus fixing board are provided with through holes formed therein for positioningly fixing a plurality of optical connectors on the printed circuit board, the optical connectors holding a plurality of light emitting elements and light receiving elements for respectively inputting/outputting optical signals to one or more groups of signal light incoming/outgoing areas, each group consisting of the signal light incoming/outgoing areas of the optical data buses aligned on the substantially straight line.

2. The photoelectric back plane board as set forth in claim 1, wherein the through holes are formed so as to penetrate the printed circuit board and the multiple optical data bus fixing board when the boards are stacked in layers and wherein the multiple optical data bus fixing board has the same or approximately the same thermal expansion coefficient as the optical data bus.

3. A photoelectric back plane board, comprising:
    a plurality of optical data buses made of a long plate of light transmissive material having a configuration including a longitudinal side formed into a plurality of steps at intervals such that light emitting elements and light receiving elements may be arranged between a first and second end of the optical data bus, the plurality of steps defining signal light incoming and outgoing areas formed by sloping a longitudinal end of each of the plurality of steps at approximately 45 degrees in relation to a surface of the optical data bus;
    an optical data bus guide plate including a plate having approximately the same thickness as the optical data bus and provided with a plurality of through guide holes having a contour corresponding to the configuration of the optical data bus, the guide holes being formed in the optical data bus guide plate at approximately the same intervals so that when the respective optical data buses are inserted into the guide holes, the corresponding signal light incoming and outgoing areas of the respective optical data buses may be aligned on substantially straight lines, respectively; and
    a printed circuit board on which the optical data bus guide plate is removablly mounted with the respective optical data buses fixed and inserted in the guide holes and on the surface of which a plurality of electrical connectors are fixed for supplying power or inputting/outputting signals to a plurality of circuit boards performing optical communication therebetween via the respective optical data buses inserted and fixed in the guide holes, the printed circuit board supplying power or inputting/outputting signals to the respective circuit board via the respective electrical connectors,
    wherein the printed circuit board is, or both of the printed circuit board and the optical data bus guide plate are provided with through holes formed therein for positioningly fixing a plurality of optical connectors on the printed circuit board, the optical connectors holding a plurality of light emitting elements and light receiving elements for respectively inputting/outputting optical signals to one or more groups of signal light incoming/outgoing areas, each group consisting of the signal light incoming/outgoing areas of the optical data buses aligned on a substantially straight line.

4. The photoelectric back plane board as set forth in claim 3, wherein the through holes are formed so as to penetrate the printed circuit board and the optical data bus guide plate when the boards are stacked in layers and wherein the optical data bus guide plate has the same or approximately the same thermal expansion coefficient as the optical data bus.

5. A photoelectric back plane board, comprising:

a plurality of optical data buses made of a long plate of light transmissive material having a configuration including a longitudinal side formed into a plurality of steps at intervals such that light emitting elements and light receiving elements may be arranged between a first and second end of the optical data bus, the plurality of steps defining signal light incoming/outgoing areas formed by sloping a longitudinal end of each of the plurality of steps at approximately 45 degrees in relation to a surface of the optical data bus;

a plurality of single optical data bus fixing boards each provided with a recess for insertion of an optical data bus having a contour corresponding to the configuration of the optical data bus, one of the optical data buses being inserted and fixed in the recess for insertion of an optical data bus; and a printed circuit board on which the plurality of single optical data bus fixing boards are removablly mounted such that when the respective optical data buses are inserted into the recesses for insertion of an optical data bus, the corresponding signal light incoming and outgoing areas of the respective optical data buses are aligned on substantially straight lines, respectively, and on the surface of which a plurality of electrical connectors are fixed for supplying power or inputting/outputting signals to a plurality of circuit boards performing optical communication therebetween via the respective optical data buses inserted and fixed in the recesses for insertion of an optical data bus, the printed circuit board supplying power or inputting/outputting signals to the respective circuit board via the respective electrical connectors, wherein the printed circuit board is provided with through holes formed therein for positioningly fixing a plurality of optical connectors on the printed circuit board, the optical connectors holding a plurality of light emitting elements and light receiving elements for respectively inputting/outputting optical signals to one or more groups of signal light incoming/outgoing areas, each group consisting of the signal light incoming/outgoing areas of the optical data buses aligned on a substantially straight line.

6. A photoelectric back plane board, comprising:

a plurality of optical data buses made of a long plate of light transmissive material having a configuration including a longitudinal side formed into a plurality of steps at intervals such that light emitting elements and light receiving elements may be arranged between a first and second end of the optical data bus, the plurality of steps defining signal light incoming/outgoing areas formed by sloping a longitudinal end of each of the plurality of steps at approximately 45 degrees in relation to a surface of the optical data bus; and a printed circuit board provided with a plurality of recesses for insertion of an optical data bus having a contour corresponding to the configuration of the optical data bus, the recesses for insertion of an optical data bus being formed at approximately the same intervals so that when the respective optical data buses are inserted into the recesses for insertion of an optical data bus, the corresponding signal light incoming and outgoing areas of the respective optical data buses may be aligned on substantially straight lines, respectively, and on the surface of which a plurality of electrical connectors are fixed for supplying power or inputting/outputting signals to a plurality of circuit boards performing optical communication therebetween via the respective optical data buses inserted and fixed in the recesses for insertion of an optical data bus, the printed circuit board supplying power or inputting/outputting signals to the respective circuit board via the respective electrical connectors, wherein the printed circuit board is provided with through holes formed therein for positioningly fixing a plurality of optical connectors on the printed circuit board, the optical connectors holding a plurality of light emitting elements and light receiving elements for respectively inputting/outputting optical signals to one or more groups of signal light incoming/outgoing areas, each group consisting of the signal light incoming/outgoing areas of the optical data buses aligned on a substantially straight line.

7. A photoelectric back plane board, comprising:

a plurality of optical data buses made of a long plate of light transmissive material having a configuration including a longitudinal side formed into a plurality of steps at intervals such that light emitting elements and light receiving elements may be arranged between a first and second end of the optical data bus, the plurality of steps defining signal light incoming/outgoing areas formed by sloping a longitudinal end of each of the plurality of steps at approximately 45 degrees in relation to a surface of the optical data bus;

an optical data bus fixing board provided with a plurality of recesses for insertion of an optical data bus having a contour corresponding to the configuration of the optical data bus, the recesses for insertion of an optical data bus being formed at approximately the same intervals so that when the respective optical data buses are inserted into the recesses for insertion of an optical data bus, the corresponding signal light incoming and outgoing areas of the respective optical data buses may be aligned on substantially straight lines, respectively; and a printed circuit board on which the optical data bus fixing board with the respective recesses for insertion of an optical data bus in which respective optical data buses are inserted and fixed is removablly mounted, and on the surface of which a plurality of electrical connectors are fixed for supplying power or inputting/outputting signals to a plurality of circuit boards performing optical communication therebetween via the respective optical data buses inserted and fixed in the recesses for insertion of an optical data bus, the printed circuit board supplying power or inputting/outputting signals to the respective circuit board via the respective electrical connectors, wherein the optical data bus fixing board is provided with through holes formed therein for positioningly fixing a plurality of optical connectors on the printed circuit board, the optical connectors holding a plurality of light emitting elements and light receiving elements for respectively inputting/outputting optical signals to one or more groups of signal light incoming/outgoing areas, each group consisting of the signal light incoming/outgoing areas of the optical data buses aligned on the substantially straight line, and wherein the optical data bus fixing board is fixed on the printed circuit board by means of at least one positioning member for positioning the optical data bus fixing board with respect to the printed circuit board at one or a plurality of points on a straight line substantially perpendicular to the longitudinal direction of the optical data bus, and of a guide rail for covering the optical data bus fixing board from above at a position distant from the point at which the optical data bus fixing board is positioned with respect to the printed circuit board and for pressing the optical data bus fixing board on the printed circuit board.

8. The photoelectric back plane board as set forth in claim 7, wherein the positioning member comprises a pin provided for one of the optical data bus fixing board and the printed circuit board and a bush provided for the other of the optical data bus fixing board and the printed circuit board and capable of being fitted the pin thereinto, and wherein the optical data bus fixing board is positioned with respect to the printed circuit board by engagement of the pin and the bush.

9. The photoelectric back plane board as set forth in claim 7, wherein a pair of guide rails are provided for the optical data bus fixing board so as to pressingly fix the optical data bus fixing board on the printed circuit board at both longitudinal ends of the optical data bus fixing board.

10. The photoelectric back plane board as set forth in claim 7, wherein the thermal expansion coefficient of the optical data bus fixing board is approximately the same as the thermal expansion coefficient of the optical data bus.

11. An information processing system, comprising:

a photoelectric back plane board as set forth in claim 1;

a plurality of information devices including a computer;

a plurality of circuit boards connected to at least one of the information devices via signal lines and electrically connected to the printed circuit board of the photoelectric back plane board via electrical connectors fixed on the printed circuit board, for performing optical communication via an optical data bus fixed on the printed circuit board in accordance with signals inputted from or outputted to the information devices and the printed circuit board through the signal lines and the electrical connectors; and a plurality of optical connectors for holding a plurality of light emitting elements and light receiving elements for respectively inputting/outputting optical signals to one or more groups of signal light incoming/outgoing areas, each group consisting of the signal light incoming/outgoing areas of the optical data buses aligned on a substantially straight line, and holding the respective circuit boards so as to enable inputting and outputting electrical signals to the light emitting elements and the light receiving elements.

\* \* \* \* \*